US012189893B2

United States Patent
Lee et al.

(10) Patent No.: US 12,189,893 B2
(45) Date of Patent: Jan. 7, 2025

(54) TOUCH TEST DEVICE AND METHOD FOR DISPLAY DEVICE

(71) Applicant: SAMSUNG DISPLAY CO., LTD., Yongin-si (KR)

(72) Inventors: Seung Rok Lee, Yongin-si (KR); Jin Woo Park, Yongin-si (KR); Tae Joon Kim, Yongin-si (KR); Jung Mok Park, Yongin-si (KR); Il Ho Lee, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/239,225

(22) Filed: Aug. 29, 2023

(65) Prior Publication Data
US 2024/0241600 A1 Jul. 18, 2024

(30) Foreign Application Priority Data
Jan. 18, 2023 (KR) .................. 10-2023-0007325

(51) Int. Cl.
*G06F 3/041* (2006.01)

(52) U.S. Cl.
CPC .......... *G06F 3/0418* (2013.01); *G06F 3/0412* (2013.01)

(58) Field of Classification Search
CPC .... G09G 3/0418; G09G 3/0412; G09G 3/006; G01R 31/2825; G01R 31/2837; G01R 31/3839
See application file for complete search history.

(56) References Cited

U.S. PATENT DOCUMENTS

| 8,604,798 | B2 * | 12/2013 | Casillan | G06F 3/0416 324/555 |
| 9,791,494 | B2 * | 10/2017 | Deumal Herraiz | G01R 31/2829 |
| 10,260,983 | B2 * | 4/2019 | Ferré | G01D 18/00 |
| 2007/0200831 | A1 * | 8/2007 | Wang | G06F 3/04164 345/173 |
| 2011/0050620 | A1 * | 3/2011 | Hristov | G06F 3/04184 345/174 |

FOREIGN PATENT DOCUMENTS

KR 10-1935432 4/2019

* cited by examiner

*Primary Examiner* — David Tung
(74) *Attorney, Agent, or Firm* — F. CHAU & ASSOCIATES, LLC

(57) ABSTRACT

A touch test device for a display device, includes a loading unit receiving a display device. The display device includes a touch sensing unit having driving electrodes and sensing electrodes. A touch driving circuit driving the driving electrodes and the sensing electrodes and detecting touch signal data for the driving electrodes, sensing signal data for the sensing electrodes, and touch data of touch nodes positioned at intersections between the driving electrodes and the sensing electrodes. A test processing circuit calculates parameter values inversely proportional to resistance deviations of the driving electrodes and the sensing electrodes, performs an arithmetic operation on the parameter values and the touch data of the touch nodes to provide corrected touch data, and detects defects in the driving electrodes and the sensing electrodes according to a result of comparing and analyzing the corrected touch data.

18 Claims, 19 Drawing Sheets

FIG. 10

| | Tx1 | Tx2 | Tx3 | Tx4 | Tx5 | Tx6 | Tx7 | Tx8 | Tx9 | Tx10 | UN(RE) |
|---|---|---|---|---|---|---|---|---|---|---|---|
| Rx1 | 1000 | 860 | 1000 | 1000 | 1000 | 1000 | 1000 | 1000 | 1000 | 1000 | 92.9 |
| Rx2 | 1233 | 1093 | 1233 | 1233 | 1233 | 1233 | 1233 | 1233 | 1233 | 1233 | 94.3 |
| Rx3 | 1466 | 1326 | 1466 | 1466 | 1466 | 1466 | 1466 | 1466 | 1466 | 1466 | 95.2 |
| Rx4 | 1699 | 1559 | 1699 | 1699 | 1699 | 1699 | 1699 | 1699 | 1699 | 1699 | 95.8 |
| Rx5 | 1932 | 1792 | 1932 | 1932 | 1932 | 1932 | 1932 | 1932 | 1932 | 1932 | 96.4 |
| Rx6 | 2165 | 2025 | 2165 | 2165 | 2165 | 2165 | 2165 | 2165 | 2165 | 2165 | 96.7 |
| Rx7 | 2398 | 2258 | 2398 | 2398 | 2398 | 2398 | 2398 | 2398 | 2398 | 2398 | 97.1 |
| Rx8 | 2631 | 2491 | 2631 | 2631 | 2631 | 2631 | 2631 | 2631 | 2631 | 2631 | 97.3 |
| Rx9 | 2864 | 2724 | 2864 | 2864 | 2864 | 2864 | 2864 | 2864 | 2864 | 2864 | 97.5 |
| Rx10 | 3097 | 2957 | 3097 | 3097 | 3097 | 3097 | 3097 | 3097 | 3097 | 3097 | 97.7 |
| Rx11 | 3330 | 3190 | 3330 | 3330 | 3330 | 3330 | 3330 | 3330 | 3330 | 3330 | 97.9 |
| Rx12 | 3563 | 3423 | 3563 | 3563 | 3563 | 3563 | 3563 | 3563 | 3563 | 3563 | 98.0 |
| Rx13 | 3796 | 3656 | 3796 | 3796 | 3796 | 3796 | 3796 | 3796 | 3796 | 3796 | 98.1 |
| Rx14 | 4029 | 3889 | 4029 | 4029 | 4029 | 4029 | 4029 | 4029 | 4029 | 4029 | 98.3 |
| Rx15 | 4262 | 4122 | 4262 | 4262 | 4262 | 4262 | 4262 | 4262 | 4262 | 4262 | 98.4 |
| Rx16 | 4495 | 4355 | 4495 | 4495 | 4495 | 4495 | 4495 | 4495 | 4495 | 4495 | 98.4 |
| Rx17 | 4728 | 4588 | 4728 | 4728 | 4728 | 4728 | 4728 | 4728 | 4728 | 4728 | 98.5 |
| Rx18 | 4961 | 4821 | 4961 | 4961 | 4961 | 4961 | 4961 | 4961 | 4961 | 4961 | 98.6 |
| Rx19 | 5194 | 5054 | 5194 | 5194 | 5194 | 5194 | 5194 | 5194 | 5194 | 5194 | 98.6 |
| Rx20 | 5427 | 5287 | 5427 | 5427 | 5427 | 5427 | 5427 | 5427 | 5427 | 5427 | 98.7 |
| Rx21 | 5660 | 5520 | 5660 | 5660 | 5660 | 5660 | 5660 | 5660 | 5660 | 5660 | 98.8 |
| UN(TE) | 30.0 | 27.0 | 30.0 | 30.0 | 30.0 | 30.0 | 30.0 | 30.0 | 30.0 | 30.0 | |

FIG. 12

|  | Tx1 | Tx2 | Tx3 | Tx4 | Tx5 | Tx6 | Tx7 | Tx8 | Tx9 | Tx10 | UN(RE) |
|---|---|---|---|---|---|---|---|---|---|---|---|
| Rx1 | 1000 | 950 | 1000 | 1000 | 1000 | 1000 | 1000 | 1000 | 1000 | 1000 | 97.5 |
| Rx2 | 1100 | 1050 | 1100 | 1100 | 1100 | 1100 | 1100 | 1100 | 1100 | 1100 | 97.7 |
| Rx3 | 1200 | 1150 | 1200 | 1200 | 1200 | 1200 | 1200 | 1200 | 1200 | 1200 | 97.9 |
| Rx4 | 1300 | 1250 | 1300 | 1300 | 1300 | 1300 | 1300 | 1300 | 1300 | 1300 | 98.1 |
| Rx5 | 1400 | 1350 | 1400 | 1400 | 1400 | 1400 | 1400 | 1400 | 1400 | 1400 | 98.2 |
| Rx6 | 1500 | 1450 | 1500 | 1500 | 1500 | 1500 | 1500 | 1500 | 1500 | 1500 | 98.3 |
| Rx7 | 1600 | 1550 | 1600 | 1600 | 1600 | 1600 | 1600 | 1600 | 1600 | 1600 | 98.4 |
| Rx8 | 1700 | 1650 | 1700 | 1700 | 1700 | 1700 | 1700 | 1700 | 1700 | 1700 | 98.5 |
| Rx9 | 1800 | 1750 | 1800 | 1800 | 1800 | 1800 | 1800 | 1800 | 1800 | 1800 | 98.6 |
| Rx10 | 1900 | 1850 | 1900 | 1900 | 1900 | 1900 | 1900 | 1900 | 1900 | 1900 | 98.7 |
| Rx11 | 2000 | 1950 | 2000 | 2000 | 2000 | 2000 | 2000 | 2000 | 2000 | 2000 | 98.7 |
| Rx12 | 2100 | 2050 | 2100 | 2100 | 2100 | 2100 | 2100 | 2100 | 2100 | 2100 | 98.8 |
| Rx13 | 2200 | 2150 | 2200 | 2200 | 2200 | 2200 | 2200 | 2200 | 2200 | 2200 | 98.9 |
| Rx14 | 2300 | 2250 | 2300 | 2300 | 2300 | 2300 | 2300 | 2300 | 2300 | 2300 | 98.9 |
| Rx15 | 2400 | 2350 | 2400 | 2400 | 2400 | 2400 | 2400 | 2400 | 2400 | 2400 | 99.0 |
| Rx16 | 2500 | 2450 | 2500 | 2500 | 2500 | 2500 | 2500 | 2500 | 2500 | 2500 | 99.0 |
| Rx17 | 2600 | 2550 | 2600 | 2600 | 2600 | 2600 | 2600 | 2600 | 2600 | 2600 | 99.0 |
| Rx18 | 2700 | 2650 | 2700 | 2700 | 2700 | 2700 | 2700 | 2700 | 2700 | 2700 | 99.1 |
| Rx19 | 2800 | 2750 | 2800 | 2800 | 2800 | 2800 | 2800 | 2800 | 2800 | 2800 | 99.1 |
| Rx20 | 2900 | 2850 | 2900 | 2900 | 2900 | 2900 | 2900 | 2900 | 2900 | 2900 | 99.1 |
| Rx21 | 3000 | 2950 | 3000 | 3000 | 3000 | 3000 | 3000 | 3000 | 3000 | 3000 | 99.3 |
| UN(TE) | 50.0 | 46.7 | 50.0 | 50.0 | 50.0 | 50.0 | 50.0 | 50.0 | 50.0 | 50.0 |  |

FIG. 13

|  | Tx1 | Tx2 | Tx3 | Tx4 | Tx5 | Tx6 | Tx7 | Tx8 | Tx9 | Tx10 |
|---|---|---|---|---|---|---|---|---|---|---|
| Rx1 | Tx | Rx | Tx | Tx | Tx | Tx | Tx | Tx | Tx | Tx |
| Rx2 | Tx | Rx | Tx | Tx | Tx | Tx | Tx | Tx | Tx | Tx |
| Rx3 | Tx | Rx | Tx | Tx | Tx | Tx | Tx | Tx | Tx | Tx |
| Rx4 | Tx | Rx | Tx | Tx | Tx | Tx | Tx | Tx | Tx | Tx |
| Rx5 | Tx | Rx | Tx | Tx | Tx | Tx | Tx | Tx | Tx | Tx |
| Rx6 | Tx | Rx | Tx | Tx | Tx | Tx | Tx | Tx | Tx | Tx |
| Rx7 | Tx | Rx | Tx | Tx | Tx | Tx | Tx | Tx | Tx | Tx |
| Rx8 | Tx | Rx | Tx | Tx | Tx | Tx | Tx | Tx | Tx | Tx |
| Rx9 | Tx | Rx | Tx | Tx | Tx | Tx | Tx | Tx | Tx | Tx |
| Rx10 | Tx | Rx | Tx | Tx | Tx | Tx | Tx | Tx | Tx | Tx |
| Rx11 | Tx | Rx | Tx | Tx | Tx | Tx | Tx | Tx | Tx | Tx |
| Rx12 | Tx | Rx | Tx | Tx | Tx | Tx | Tx | Tx | Tx | Tx |
| Rx13 | Tx | Rx | Tx | Tx | Tx | Tx | Tx | Tx | Tx | Tx |
| Rx14 | Tx | Rx | Tx | Tx | Tx | Tx | Tx | Tx | Tx | Tx |
| Rx15 | Tx | Rx | Tx | Tx | Tx | Tx | Tx | Tx | Tx | Tx |
| Rx16 | Tx | Rx | Tx | Tx | Tx | Tx | Tx | Tx | Tx | Tx |
| Rx17 | Tx | Rx | Tx | Tx | Tx | Tx | Tx | Tx | Tx | Tx |
| Rx18 | Tx | Rx | Tx | Tx | Tx | Tx | Tx | Tx | Tx | Tx |
| Rx19 | Tx | Rx | Tx | Tx | Tx | Tx | Tx | Tx | Tx | Tx |
| Rx20 | Tx | Rx | Tx | Tx | Tx | Tx | Tx | Tx | Tx | Tx |
| Rx21 | Tx | Rx | Tx | Tx | Tx | Tx | Tx | Tx | Tx | Tx |

OPE

FIG. 14

|  | Tx1 | Tx2 | Tx3 | Tx4 | Tx5 | Tx6 | Tx7 | Tx8 | Tx9 | Tx10 | UN(RE) |
|---|---|---|---|---|---|---|---|---|---|---|---|
| Rx1 | 1000 | 985 | 1000 | 1000 | 1000 | 1000 | 1000 | 1000 | 1000 | 1000 | 99.2 |
| Rx2 | 1025 | 1010 | 1025 | 1025 | 1025 | 1025 | 1025 | 1025 | 1025 | 1025 | 99.3 |
| Rx3 | 1050 | 1035 | 1050 | 1050 | 1050 | 1050 | 1050 | 1050 | 1050 | 1050 | 99.3 |
| Rx4 | 1075 | 1060 | 1075 | 1075 | 1075 | 1075 | 1075 | 1075 | 1075 | 1075 | 99.3 |
| Rx5 | 1100 | 1085 | 1100 | 1100 | 1100 | 1100 | 1100 | 1100 | 1100 | 1100 | 99.3 |
| Rx6 | 1125 | 1110 | 1125 | 1125 | 1125 | 1125 | 1125 | 1125 | 1125 | 1125 | 99.3 |
| Rx7 | 1150 | 1135 | 1150 | 1150 | 1150 | 1150 | 1150 | 1150 | 1150 | 1150 | 99.3 |
| Rx8 | 1175 | 1160 | 1175 | 1175 | 1175 | 1175 | 1175 | 1175 | 1175 | 1175 | 99.4 |
| Rx9 | 1200 | 1185 | 1200 | 1200 | 1200 | 1200 | 1200 | 1200 | 1200 | 1200 | 99.4 |
| Rx10 | 1225 | 1210 | 1225 | 1225 | 1225 | 1225 | 1225 | 1225 | 1225 | 1225 | 99.4 |
| Rx11 | 1250 | 1235 | 1250 | 1250 | 1250 | 1250 | 1250 | 1250 | 1250 | 1250 | 99.4 |
| Rx12 | 1275 | 1260 | 1275 | 1275 | 1275 | 1275 | 1275 | 1275 | 1275 | 1275 | 99.4 |
| Rx13 | 1300 | 1285 | 1300 | 1300 | 1300 | 1300 | 1300 | 1300 | 1300 | 1300 | 99.4 |
| Rx14 | 1325 | 1310 | 1325 | 1325 | 1325 | 1325 | 1325 | 1325 | 1325 | 1325 | 99.4 |
| Rx15 | 1350 | 1335 | 1350 | 1350 | 1350 | 1350 | 1350 | 1350 | 1350 | 1350 | 98.4 |
| Rx16 | 1375 | 1360 | 1375 | 1375 | 1375 | 1375 | 1375 | 1375 | 1375 | 1375 | 99.5 |
| Rx17 | 1400 | 1385 | 1400 | 1400 | 1400 | 1400 | 1400 | 1400 | 1400 | 1400 | 99.5 |
| Rx18 | 1425 | 1410 | 1425 | 1425 | 1425 | 1425 | 1425 | 1425 | 1425 | 1425 | 99.5 |
| Rx19 | 1450 | 1435 | 1450 | 1450 | 1450 | 1450 | 1450 | 1450 | 1450 | 1450 | 99.5 |
| Rx20 | 1475 | 1460 | 1475 | 1475 | 1475 | 1475 | 1475 | 1475 | 1475 | 1475 | 99.5 |
| Rx21 | 1500 | 1485 | 1500 | 1500 | 1500 | 1500 | 1500 | 1500 | 1500 | 1500 | 99.5 |
| UN(TE) | 80.0 | 79.8 | 80.0 | 80.0 | 80.0 | 80.0 | 80.0 | 80.0 | 80.0 | 80.0 |  |

FIG. 15

|  | Tx1 | Tx2 | Tx3 | Tx4 | Tx5 | Tx6 | Tx7 | Tx8 | Tx9 | Tx10 |
|---|---|---|---|---|---|---|---|---|---|---|
| Rx1 | Tx | Rx | Tx | Tx | Tx | Tx | Tx | Tx | Tx | Tx |
| Rx2 | Tx | Rx | Tx | Tx | Tx | Tx | Tx | Tx | Tx | Tx |
| Rx3 | Tx | Rx | Tx | Tx | Tx | Tx | Tx | Tx | Tx | Tx |
| Rx4 | Tx | Rx | Tx | Tx | Tx | Tx | Tx | Tx | Tx | Tx |
| Rx5 | Tx | Rx | Tx | Tx | Tx | Tx | Tx | Tx | Tx | Tx |
| Rx6 | Tx | Rx | Tx | Tx | Tx | Tx | Tx | Tx | Tx | Tx |
| Rx7 | Tx | Rx | Tx | Tx | Tx | Tx | Tx | Tx | Tx | Tx |
| Rx8 | Tx | Rx | Tx | Tx | Tx | Tx | Tx | Tx | Tx | Tx |
| Rx9 | Tx | Rx | Tx | Tx | Tx | Tx | Tx | Tx | Tx | Tx |
| Rx10 | Tx | Rx | Tx | Tx | Tx | Tx | Tx | Tx | Tx | Tx |
| Rx11 | Tx | Rx | Tx | Tx | Tx | Tx | Tx | Tx | Tx | Tx |
| Rx12 | Tx | Rx | Tx | Tx | Tx | Tx | Tx | Tx | Tx | Tx |
| Rx13 | Tx | Rx | Tx | Tx | Tx | Tx | Tx | Tx | Tx | Tx |
| Rx14 | Tx | Rx | Tx | Tx | Tx | Tx | Tx | Tx | Tx | Tx |
| Rx15 | Tx | Rx | Tx | Tx | Tx | Tx | Tx | Tx | Tx | Tx |
| Rx16 | Tx | Rx | Tx | Tx | Tx | Tx | Tx | Tx | Tx | Tx |
| Rx17 | Tx | Rx | Tx | Tx | Tx | Tx | Tx | Tx | Tx | Tx |
| Rx18 | Tx | Rx | Tx | Tx | Tx | Tx | Tx | Tx | Tx | Tx |
| Rx19 | Tx | Rx | Tx | Tx | Tx | Tx | Tx | Tx | Tx | Tx |
| Rx20 | Tx | Rx | Tx | Tx | Tx | Tx | Tx | Tx | Tx | Tx |
| Rx21 | Tx | Rx | Tx | Tx | Tx | Tx | Tx | Tx | Tx | Tx |

OPE

TOUCH TEST DEVICE AND METHOD FOR DISPLAY DEVICE

This application claims priority under 35 U.S.C. § 119 to Korean Patent Application No. 10-2023-0007325, filed on Jan. 18, 2023 in the Korean Intellectual Property Office, the disclosure of which is incorporated by reference in its entirety herein.

1. TECHNICAL FIELD

The present disclosure relates to a touch test device and method for a display device.

2. DISCUSSION OF RELATED ART

The demand for display devices for displaying images applied to various different electronic devices has increased along with the advancement of the information society. For example, display devices are applied to various electronic devices such as smartphones, digital cameras, laptop computers, navigation devices, and smart televisions.

Types of display devices include flat panel display devices, such as liquid crystal display devices, field emission display devices and organic light emitting display devices. Among these flat panel display devices, a light emitting display device includes a light emitting element that enables each pixel of a display panel to emit light by itself. Thus, the light emitting display device can display an image without requiring a backlight unit to provide light to the display panel.

Recently, display devices have been developed to include a touch sensing module that senses a user's touch for an input interface. The touch sensing module includes a touch sensing unit in which touch electrodes are arranged and a touch driving circuit which detects the amount of charge in capacitance between the touch electrodes. The touch sensing module may be mass-produced in a state in which it is integrally formed on an image display unit of a display device or mounted on a front surface of the image display unit.

SUMMARY

Aspects of the present disclosure provide a touch test device and method which can increase the efficiency of calculating difference values for touch signal data of touch driving electrodes and sensing signal data of touch sensing electrodes during a touch test on display devices.

Aspects of the present disclosure also provide a touch test device and method for a display device, the touch test device and method capable of increasing the accuracy of detecting defects in touch driving electrodes and touch sensing electrodes.

However, aspects of embodiments of the present disclosure are not restricted to the one set forth herein. The above and other aspects of embodiments of the present disclosure will become more apparent to one of ordinary skill in the art to which the present disclosure pertains by referencing the detailed description of embodiments of the present disclosure given below.

According to an embodiment of the present disclosure, a touch test device for a display device, includes a loading unit receiving a display device. The display device includes a touch sensing unit having driving electrodes and sensing electrodes. A touch driving circuit driving the driving electrodes and the sensing electrodes and detecting touch signal data for the driving electrodes, sensing signal data for the sensing electrodes, and touch data of touch nodes positioned at intersections between the driving electrodes and the sensing electrodes. A test processing circuit calculates parameter values inversely proportional to resistance deviations of the driving electrodes and the sensing electrodes, performs an arithmetic operation on the parameter values and the touch data of the touch nodes to provide corrected touch data, and detects defects in the driving electrodes and the sensing electrodes according to a result of comparing and analyzing the corrected touch data.

In an embodiment, the touch driving circuit detects touch driving signals transmitted to the driving electrodes and touch sensing signals for the sensing electrodes, converts the touch driving signals into the touch signal data and the touch sensing signals into the sensing signal data, and generates the touch data according to a change in mutual capacitance of each of the touch nodes.

In an embodiment, the test processing circuit calculates first parameter values that are inversely proportional to the resistance deviations of the driving electrodes by performing a first arithmetic operation on the touch signal data of the driving electrodes using a first inverse proportion formula and calculates second parameter values that are inversely proportional to the resistance deviations of the sensing electrodes by performing a second arithmetic operation on the sensing signal data of the sensing electrodes using a second inverse proportion formula.

In an embodiment, the first inversion proportion formula is as follows:

$$UN(TEn) = 100 - \frac{\text{Max}(TEn) - \text{Min}(TEn)}{2 \times Avg(TEn)} \times 100$$

where n is a positive integer, UN(TEn) is a first parameter value for an n-th driving electrode TEn, Max(TEn) is a maximum value of the touch signal data, Min(TEn) is a minimum value of the touch signal data and Avg(TEn) is an average value of the touch signal data, and the second inversion proportion formula is as follows:

$$UN(REn) = 100 - \frac{\text{Max}(REn) - \text{Min}(REn)}{2 \times Avg(REn)} \times 100$$

where UN(REn) is a second parameter value for an n-th sensing electrode REn, Max(REn) is a maximum value of the sensing signal data, Min(REn) is a minimum value of the sensing signal data and Avg(REn) is an average value of the sensing signal data.

In an embodiment, the test processing circuit corrects the touch data of the touch nodes by performing a cross-operation on the touch data of the touch nodes and the first and second parameter values using first and second ratio calculation formulas.

In an embodiment, the first ratio calculation formula is as follows:

$$GAP(TNmn/TNnm) = UN(REn) \times |TNmn/TNnm| \times 100 - 100$$

where GAP(TNmn/TNnm) is a corrected data value of touch data obtained by multiplying a difference value (|TNmn/TNnm|) between the touch data adjacent in an arrangement direction of the driving electrodes by a second parameter value of the second parameter values as a percentage.

In an embodiment, the second ratio calculation formula is as follows:

$$GAP(TNnm/TNmn) = UN(TEn) \times |TNnm/TNmn| \times 100 - 100$$

where GAP(TNnm/TNmn) is a corrected data value of touch data obtained by multiplying a difference value (|TNnm/TNmn|) between touch data adjacent in an arrangement direction of the sensing electrodes by a first parameter value of the first parameter values as a percentage.

In an embodiment, the test processing circuit compares the corrected touch data of the touch nodes with corrected touch data adjacent in arrangement directions of the driving electrodes and the sensing electrodes and, detects a driving electrode and sensing electrode as defective if difference values between the compared corrected touch data are greater than or equal to a reference difference value preset according to a uniformity of the touch data.

In an embodiment, the test processing circuit comprises a touch data arrangement unit sequentially arranging the touch signal data, the sensing signal data, and the touch data of the touch nodes. A first/second parameter calculation unit calculates the first parameter values inversely proportional to the resistance deviations of the driving electrodes by performing a first arithmetic operation on the touch signal data using a first inversion proportion formula and calculates second parameter values inversely proportional to the resistance deviations of the sensing electrodes by performing a second arithmetic operation on the sensing signal data using a second inverse proportion formula. A touch data calculation unit corrects the touch data of the touch nodes by performing a cross-operation on the touch data and the first and second parameter values using the first and second ratio calculation formulas. A touch data comparison unit detecting defects in the driving electrodes and the sensing electrodes by comparing and analyzing the corrected touch data of the touch nodes with adjacent corrected touch data. A test result output unit matching defect detection results of the driving electrodes and the sensing electrodes with positions of the driving electrodes and the sensing electrodes and outputs the matching results.

In an embodiment, the first inversion proportion formula is as follows:

$$UN(TEn) = 100 - \frac{\text{Max}(TEn) - \text{Min}(TEn)}{2 \times Avg(TEn)} \times 100$$

where n is a positive integer, UN(TEn) is a first parameter value for an n-th driving electrode TEn, Max(TEn) is a maximum value of the touch signal data, Min(TEn) is a minimum value of the touch signal data and Avg(TEn) is an average value of the touch signal data, and the second inversion proportion formula is as follows:

$$UN(REn) = 100 - \frac{\text{Max}(REn) - \text{Min}(REn)}{2 \times Avg(REn)} \times 100$$

where UN(REn) is a second parameter value for an n-th sensing electrode REn, Max(REn) is a maximum value of the sensing signal data, Min(REn) is a minimum value of the sensing signal data and Avg(REn) is an average value of the sensing signal data.

In an embodiment, the first ratio calculation formula is as follows:

$$GAP(TNmn/TNnm) = UN(REn) \times |TNmn/TNnm| \times 100 - 100$$

where GAP(TNmn/TNnm) is a corrected data value of touch data obtained by multiplying a difference value (|TNmn/TNnm|) between touch data adjacent in an arrangement direction of the driving electrodes by a second parameter value of the second parameter values as a percentage.

In an embodiment, the second ratio calculation formula is as follows:

$$GAP(TNnm/TNmn) = UN(TEn) \times |TNnm/TNmn| \times 100 - 100$$

where GAP(TNnm/TNmn) is a corrected data value of touch data obtained by multiplying a difference value (|TNnm/TNmn|) between touch data adjacent in an arrangement direction of the sensing electrodes by a first parameter value of the first parameter values as a percentage.

In an embodiment, the touch data comparison unit compares the corrected touch data of the touch nodes with corrected touch data adjacent in arrangement directions of the driving electrodes and the sensing electrodes and, detects a driving electrode and a sensing electrode as defective if difference values between the compared corrected touch data are greater than or equal to a reference difference value preset according to a uniformity of the touch data.

According to an embodiment of the present disclosure, a touch test method for a display device includes loading the display device onto a loading unit of a test device. The display device includes a touch sensing unit having driving electrodes and sensing electrodes. A power signal is supplied to a touch driving circuit of the test device. The driving electrodes and sensing electrodes are driven by using the touch driving circuit. Touch signal data for the driving electrodes, sensing signal data for the sensing electrodes, and touch data of touch nodes positioned at intersections between the driving electrodes and the sensing electrodes are detected by using the touch driving circuit. Parameter values that are inversely proportional to resistance deviations of the driving electrodes and the sensing electrodes are calculated, an arithmetic operation is performed on the parameter values and the touch data of the touch nodes to provide corrected touch data, and defects are detected in the driving electrodes and the sensing electrodes according to a result of comparing and analyzing the corrected touch data using a test processing circuit.

In an embodiment, the detecting of the defects in the driving electrodes and the sensing electrodes comprises sequentially arranging the touch signal data, the sensing signal data, and the touch data of the touch nodes, calculating first parameter values that are inversely proportional to the resistance deviations of the driving electrodes by performing a first arithmetic operation on the touch signal data using a first inverse proportion formula, calculating second parameter values that are inversely proportional to the resistance deviations of the sensing electrodes by performing a second arithmetic operation on the sensing signal data using a second inverse proportion formula, correcting the touch data of the touch nodes by performing a cross-operation on the touch data and the first and second parameter values using first and second ratio calculation formulas, comparing and analyzing the corrected touch data of the touch nodes with adjacent corrected touch data and detecting defect positions of the driving electrodes or the sensing electrodes, and matching the results of detecting the defect positions of the driving electrodes and the sensing electrodes with positions of the driving electrodes or the sensing electrodes and outputting the matching results.

In an embodiment, the first inversion proportion formula is preset as $$UN(TEn) = 100 - \frac{\text{Max}(TEn) - \text{Min}(TEn)}{2 \times Avg(TEn)} \times 100$$

where n is a positive integer, UN(TEn) is a first parameter value for an n-th driving electrode TEn, Max(TEn) is a maximum value of the touch signal data, Min(TEn) is a minimum value of the touch signal data and Avg(TEn) is an average value of the touch signal data, and the second inversion proportion formula is as follows:

$$UN(REn) = 100 - \frac{\text{Max}(REn) - \text{Min}(REn)}{2 \times Avg(REn)} \times 100$$

where UN(REn) is a second parameter value for an n-th sensing electrode REn, Max(REn) is a maximum value of the sensing signal data, Min(REn) is a minimum value of the sensing signal data and Avg(REn) is an average value of the sensing signal data.

In an embodiment, the first ratio calculation formula is as follows:

$$GAP(TNmn/TNnm) = UN(REn) \times |TNmn/TNnm| \times 100 - 100$$

where GAP(TNmn/TNnm) is a corrected data value of touch data obtained by multiplying a difference value (|TNmn/TNnm|) between touch data adjacent in an arrangement direction of the driving electrodes by a second parameter value of the second parameter values as a percentage.

In an embodiment, the second ratio calculation formula is as follows:

$$GAP(TNnm/TNmn) = UN(TEn) \times |TNnm/TNmn| \times 100 - 100$$

where GAP(TNnm/TNmn) is a corrected data value of touch data obtained by multiplying a difference value (|TNnm/TNmn|) between touch data adjacent in an arrangement direction of the sensing electrodes by a first parameter value of the first parameter values as a percentage.

In a touch test device and method for a display device according to embodiments of the present disclosure, first parameter values that are inversely proportional to resistance deviations of touch driving electrodes and second parameter values that are inversely proportional to resistance deviations of touch sensing electrodes are calculated. In addition, a cross-operation is selectively performed on touch data sensed through the touch driving electrodes and the touch sensing electrodes and the first and second parameter values, and then the touch data are compared and analyzed. Accordingly, the efficiency of calculating difference values between the touch data and the accuracy of detecting defects in the touch driving electrodes and the touch sensing electrodes can be increased.

BRIEF DESCRIPTION OF THE DRAWINGS

These and/or other aspects will become apparent and more readily appreciated from the following description of embodiments, taken in conjunction with the accompanying drawings in which:

FIG. 10 illustrates the arrangement state of touch data of touch nodes and first and second parameter values according to an embodiment of the present disclosure;

FIG. 12 illustrates the arrangement state of touch data of touch nodes and first and second parameter values according to an embodiment of the present disclosure;

FIG. 13 illustrates positions of defective touch driving electrodes detected according to data calculation results of FIG. 12 according to an embodiment of the present disclosure;

FIG. 14 illustrates the arrangement state of touch data of touch nodes and first and second parameter values according to an embodiment of the present disclosure;

FIG. 15 illustrates positions of defective touch driving electrodes detected according to data calculation results of FIG. 14 according to an embodiment of the present disclosure;

DETAILED DESCRIPTION OF EMBODIMENTS

The present disclosure will now be described more fully hereinafter with reference to the accompanying drawings, in which preferred embodiments of the disclosure are shown. This disclosure may, however, be embodied in different forms and should not be construed as limited to the embodiments set forth herein. Rather, these embodiments are provided so that this disclosure will be thorough and complete, and will fully convey the scope of the disclosure to those skilled in the art.

It will also be understood that when a layer is referred to as being "on" another layer or substrate, it can be directly on the other layer or substrate, or intervening layers may also be present. When a layer is referred to as being "directly on" another layer or substrate, no intervening layers may be present. The same reference numbers indicate the same components throughout the specification.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

Each of the features of the various embodiments of the present disclosure may be combined or combined with each other, in part or in whole, and technically various interlocking and driving are possible. Each embodiment may be implemented independently of each other or may be implemented together in an association.

Hereinafter, embodiments of the present disclosure will be described with reference to the accompanying drawings.

Figure 1:
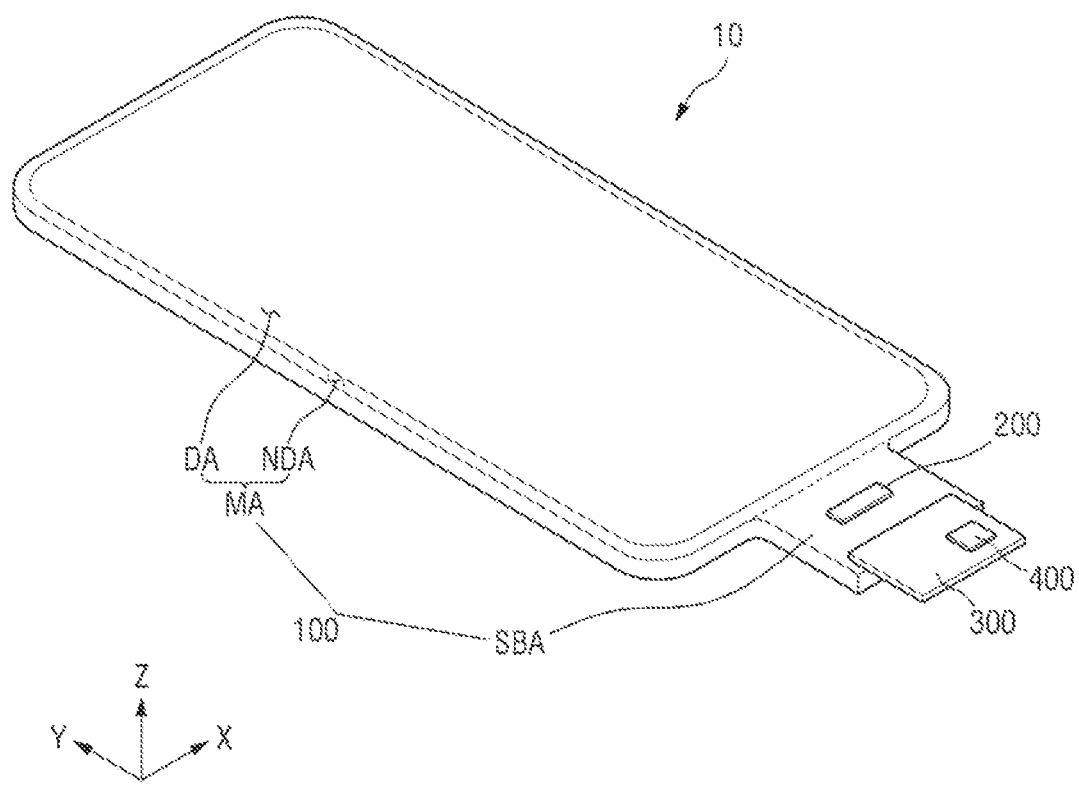
FIG. 1 is a perspective view of a display device according to an embodiment of the present disclosure.
Figure 2:
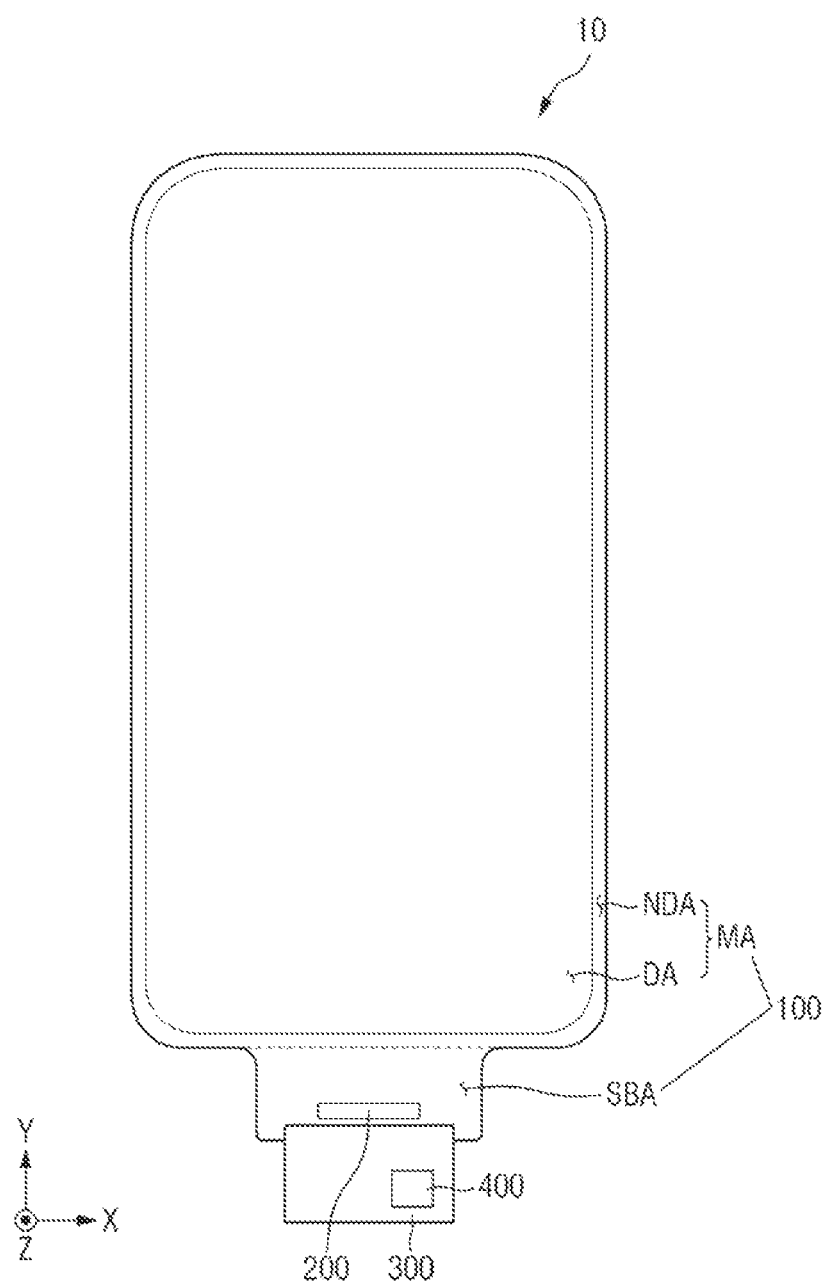
FIG. 2 is a plan view of the display device according to an embodiment of the present disclosure.
Figure 3:
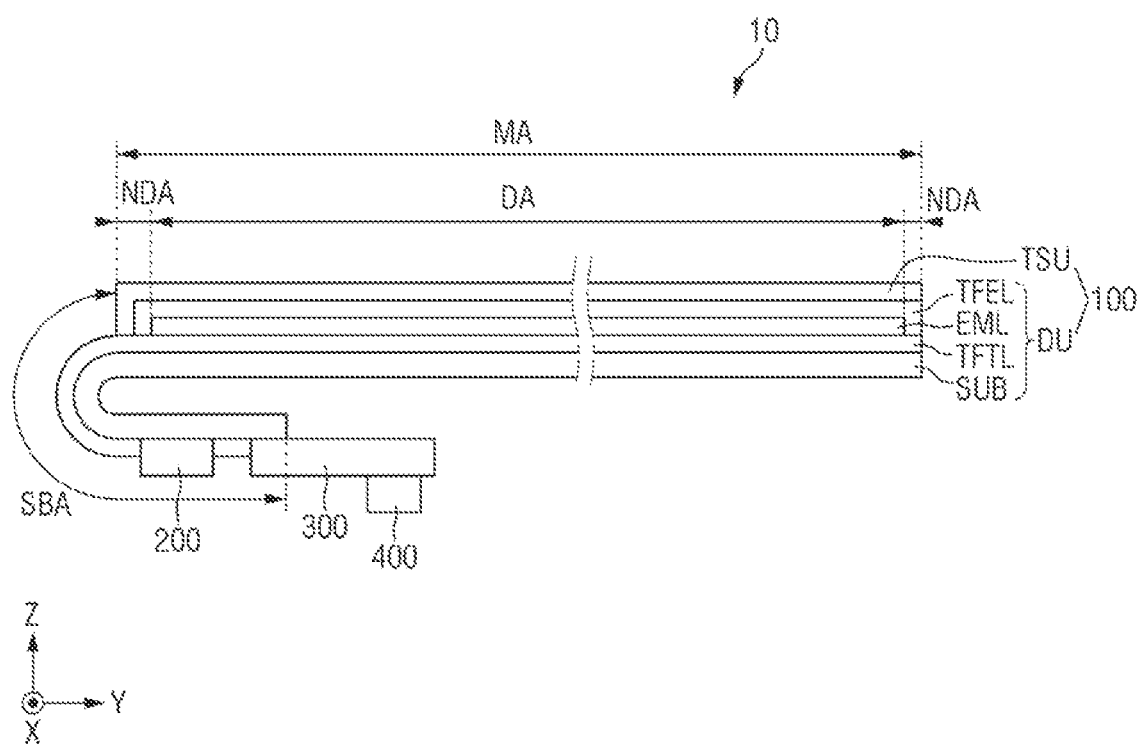
FIG. 3 is a side view of the display device according to an embodiment of the present disclosure.

FIG. 1 is a perspective view of a display device 10 according to an embodiment. FIG. 2 is a plan view of the display device 10 according to an embodiment. FIG. 3 is a side view of the display device 10 according to the embodiment.

Referring to FIGS. 1 through 3, the display device 10 according to an embodiment may be applied to portable electronic devices such as mobile phones, smartphones, tablet personal computers (PCs), mobile communication terminals, electronic notebooks, electronic books, portable multimedia players (PMPs), navigation devices, and ultra-mobile PCs (UMPCs). Alternatively, the display device 10 according to an embodiment may be applied as a display unit of a television, a laptop computer, a monitor, a billboard, or an Internet of things (IoT) device. Alternatively, the display device 10 according to an embodiment may be applied to wearable devices such as smart watches, watch phones, glass-like displays, and head-mounted displays (HMDs). Alternatively, the display device 10 according to an embodiment may be applied to a dashboard of a vehicle, a center fascia of a vehicle, a center information display (CID) disposed on a dashboard of a vehicle, a room mirror display replacing side mirrors of a vehicle, or a display disposed on the back of a front seat as an entertainment for rear-seat passengers of a vehicle. However, embodiments of the present disclosure are not necessarily limited thereto.

The display device 10 according to an embodiment may be a light emitting display device such as an organic light emitting display device using an organic light emitting diode, a quantum dot light emitting display device including a quantum dot light emitting layer, an inorganic light emitting display device including an inorganic semiconductor, or a micro- or nano-light emitting display device using a micro- or nano-light emitting diode. However, embodiments of the present disclosure are not necessarily limited thereto. An embodiment in which the display device 10 is an organic light emitting display device will be mainly described below for convenience of explanation.

The display device 10 according to an embodiment includes a display panel 100, a display driving circuit 200, a display circuit board 300, and a touch driving circuit 400.

In an embodiment, the display panel 100 may be shaped like a rectangular plane having relatively short sides in a first direction (e.g., an X-axis direction) and relatively long sides in a second direction (e.g., a Y-axis direction) intersecting the first direction (e.g., the X-axis direction). In an embodiment, each corner where a relatively short side extending in the first direction (e.g., X-axis direction) meets a relatively long side extending in the second direction (e.g., Y-axis direction) may be rounded with a predetermined curvature or may be right-angled. The planar shape of the display panel 100 is not necessarily limited to a quadrilateral shape but may also be another polygonal shape, a circular shape, an oval shape, etc. The display panel 100 may be formed flat, but embodiments of the present disclosure are not necessarily limited thereto. For example, the display panel 100 may include curved portions formed at left and right ends and having a constant or varying curvature. In addition, the display panel 100 may be formed to be flexible so that it can be curved, bent, folded, or rolled.

The display panel 100 includes a main area MA and a sub-area SBA.

The main area MA includes a display area DA displaying an image and a non-display area NDA located around the display area DA. The display area DA includes pixels displaying an image. The sub-area SBA may protrude from a side of the main area MA in the second direction (e.g., the Y-axis direction).

Although the sub-area SBA is unfolded in FIGS. 1 and 2, it may also be bent as illustrated in FIG. 3. In this embodiment, the sub-area SBA may be disposed on a lower surface of the display panel 100. When the sub-area SBA is bent, it may be overlapped by the main area MA in a third direction (e.g., a Z-axis direction) which is a thickness direction of a substrate SUB. The display driving circuit 200 may be disposed in the sub-area SBA.

In addition, the display panel 100 may include a display module DU including the substrate SUB, a thin-film transistor layer TFTL, a light emitting element layer EML and an encapsulation layer TFEL and a touch sensing unit TSU formed on a front surface of the display module DU as illustrated in FIG. 3.

The thin-film transistor layer TFTL may be disposed on the substrate SUB (e.g., in the Z direction). In an embodiment, the thin-film transistor layer TFTL may be disposed in the main area MA and the sub-area SBA. The thin-film transistor layer TFTL includes thin-film transistors.

The light emitting element layer EML may be disposed on the thin-film transistor layer TFTL (e.g., in the Z direction). The light emitting element layer EML may be disposed in the display area DA of the main area MA. The light emitting element layer EML includes light emitting elements disposed in light emitting units.

The encapsulation layer TFEL may be disposed on the light emitting element layer EML (e.g., in the Z direction). The encapsulation layer TFEL may be disposed in the display area DA and the non-display area NDA of the main area MA. The encapsulation layer TFEL includes at least one inorganic layer and at least one organic layer for encapsulating the light emitting element layer EML.

The touch sensing unit TSU may be formed on the encapsulation layer TFEL or may be mounted on the encapsulation layer TFEL (e.g., in the Z direction). In an embodiment, the touch sensing unit TSU may be disposed in the display area DA of the main area MA. The touch sensing unit TSU may sense a touch of a person or object using touch electrodes. For example, in an embodiment the touch sensing unit TSU may sense a direct touch of a person or object on the display device 10 or may detect a proximity of a person or object to the display device 10.

A cover window may be disposed on the touch sensing unit TSU to protect an upper portion of the display panel 100. In an embodiment, the cover window may be attached onto the touch sensing unit TSU by a transparent adhesive member such as an optically clear adhesive (OCA) film or an optically clear resin (OCR). The cover window may be an inorganic material such as glass or may be an organic material such as plastic or a polymer material. In an embodiment, a polarizing film may be additionally disposed between the touch sensing unit TSU and the cover window to prevent deterioration of image visibility due to the reflection of external light.

The display driving circuit 200 may generate control signals and data voltages for driving the display panel 100. In an embodiment, the display driving circuit 200 may be formed as an integrated circuit and attached onto the display panel 100 using a chip-on-glass (COG) method, a chip-on-plastic (COP) method, or an ultrasonic bonding method. However, embodiments of the present disclosure are not necessarily limited thereto. For example, the display driving circuit 200 may also be attached onto the display circuit board 300 using a chip-on-film (COF) method.

The display circuit board 300 may be attached to an end of the sub-area SBA of the display panel 100. Accordingly, the display circuit board 300 may be electrically connected to the display panel 100 and the display driving circuit 200. The display panel 100 and the display driving circuit 200 may receive digital video data, timing control signals, and driving voltages through the display circuit board 300. In an embodiment, the display circuit board 300 may be a flexible printed circuit board, a printed circuit board, or a flexible film such as a chip-on-film. However, embodiments of the present disclosure are not necessarily limited thereto.

The touch driving circuit 400 may be disposed on the display circuit board 300 (e.g., disposed directly thereon). For example, the touch driving circuit 400 may be formed as an integrated circuit and attached to the display circuit board 300.

The touch driving circuit 400 may be electrically connected to the touch electrodes of the touch sensing unit TSU. In an embodiment, the touch driving circuit 400 transmits touch driving signals to the touch electrodes of the touch sensing unit TSU and measures a charge change in the mutual capacitance of each of a plurality of touch nodes formed by the touch electrodes. For example, the touch driving circuit 400 may measure a change in the capacitance of each of the touch nodes according to a change in the voltage magnitude or current amount of a touch sensing signal received through each of the touch electrodes.

The touch driving circuit 400 may determine whether a user's touch or proximity has occurred based on a charge change in the mutual capacitance of each of the touch nodes. The user's touch indicates that a user's finger or an object such as a pen directly touches a surface of the cover window disposed on the touch sensing unit TSU. The user's proximity indicates that a user's finger or an object such as a pen hovers above a surface of the cover window.

In an embodiment, the touch driving circuit 400 may extract touch coordinates by correcting the touch sensing signals according to a noise application level according to low-temperature driving, a charging mode, high-frequency application, or an electromagnetic noise application state or may change a driving mode by itself. For example, the touch driving circuit 400 may sense a user's touch by selectively changing a touch sensing area according to whether a body part is detected in front of the display panel 100 or may change the driving mode to a low-power mode or a standby mode.

Figure 4:
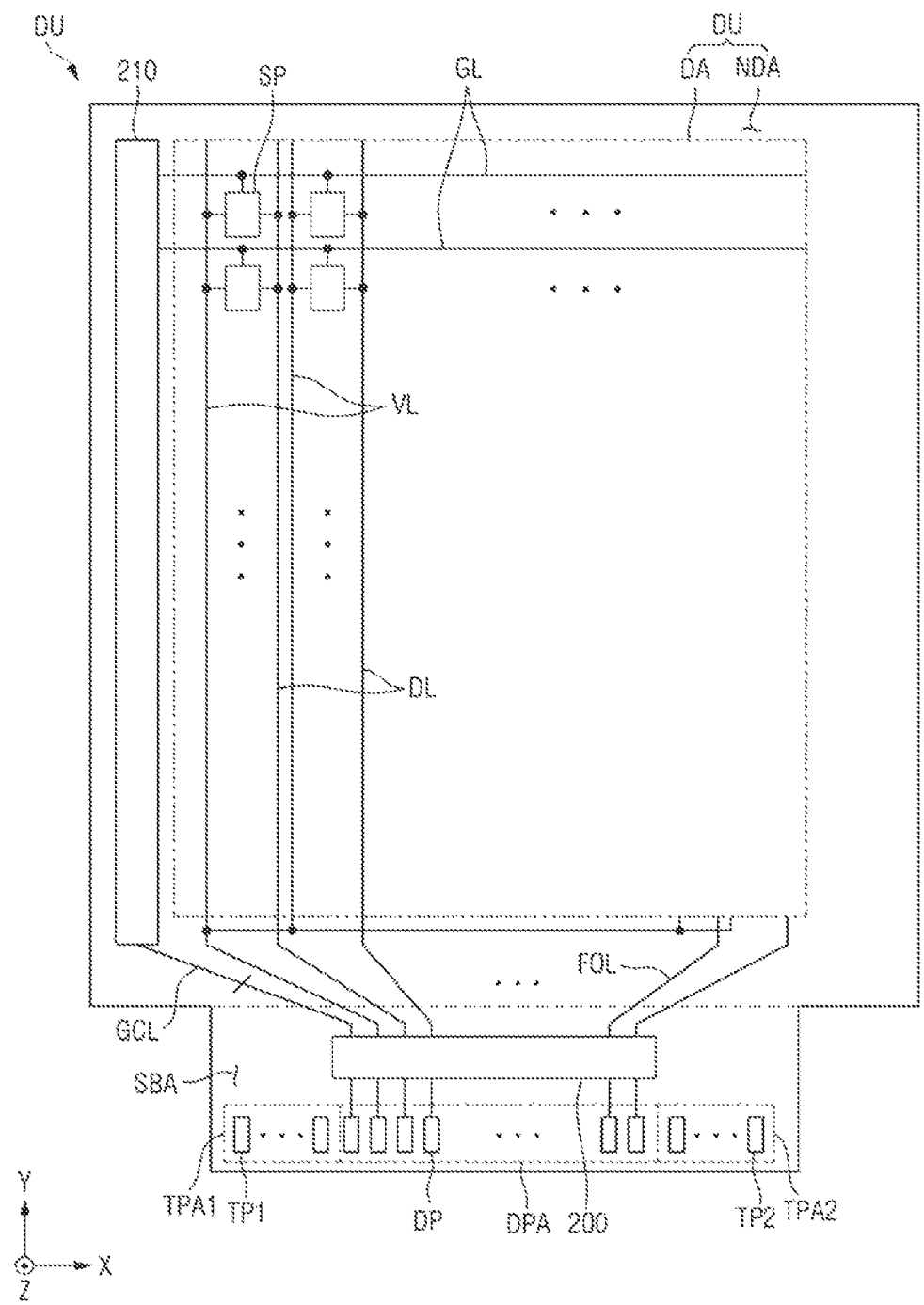
FIG. 4 is a schematic layout view of a display panel illustrated in FIGS. 1 through 3 according to embodiments of the present disclosure.

FIG. 4 is a schematic layout view of an example of the display panel 100 illustrated in FIGS. 1 through 3. Specifically, FIG. 4 is a layout view illustrating the display area DA and the non-display area NDA of the display module DU before the touch sensing unit TSU is formed.

The display area DA is an area for displaying an image and may be defined as a central area of the display panel 100. However, embodiments of the present disclosure are not necessarily limited thereto and the positioning of the display area DA may vary. The display area DA may include a plurality of pixels SP, a plurality of gate lines GL, a plurality of data lines DL, and a plurality of power lines VL. Each of the pixels SP may be defined as a minimum unit for outputting light.

The gate lines GL may supply gate signals received from a gate driver 210 to the pixels SP. In an embodiment, the gate lines GL may extend in the X-axis direction and may be spaced apart from each other in the Y-axis direction intersecting the X-axis direction.

The data lines DL may supply data voltages received from the display driving circuit 200 to the pixels SP. The data lines DL may extend in the Y-axis direction and may be spaced apart from each other in the X-axis direction.

The power lines VL may supply a power supply voltage received from the display driving circuit 200 to the pixels SP. In an embodiment, the power supply voltage may be at least one of a driving voltage, an initialization voltage, and a reference voltage. In an embodiment, the power lines VL may extend in the Y-axis direction and may be spaced apart from each other in the X-axis direction.

The non-display area NDA may surround the display area DA (e.g., in the X and/or Y directions). The non-display area NDA may include the gate driver 210, fan-out lines FOL, and gate control lines GCL. The gate driver 210 may generate a plurality of gate signals based on a gate control signal and may sequentially supply the gate signals to the gate lines GL according to a set order.

The fan-out lines FOL may extend from the display driving circuit 200 to the display area DA. The fan-out lines FOL may supply data voltages received from the display driving circuit 200 to the data lines DL.

The gate control lines GCL may extend from the display driving circuit 200 to the gate driver 210. The gate control lines GCL may supply the gate control signal received from the display driving circuit 200 to the gate driver 210.

The sub-area SBA may include the display driving circuit 200, a display pad area DPA, and first and second touch pad areas TPA1 and TPA2.

The display driving circuit 200 may output timing control signals and data voltages for driving the display panel 100 to the fan-out lines FOL. In an embodiment, the display driving circuit 200 generates timing control signals based on preset display control firmware, such as according to a display driving frequency set in the firmware and generates data voltages corresponding to image data. The display driving circuit 200 may then supply the data voltages to the data lines DL through the fan-out lines FOL according to the display driving frequency set in the firmware. In an embodiment, the data voltages may be supplied to the pixels SP and may determine luminances of the pixels SP. In addition, the display driving circuit 200 may supply the timing control signals generated according to the display driving frequency and gate voltage values of the firmware to the gate driver 210 through the gate control lines GCL.

The display pad area DPA, the first touch pad area TPA1, and the second touch pad area TPA2 may be disposed at an edge of the sub-area SBA. For example, the display pad area DPA, the first touch pad area TPA1, and the second touch pad area TPA2 may be disposed at a lower edge of the sub-area SBA in the Y direction. However, embodiments of the present disclosure are not necessarily limited thereto. In an embodiment, the display pad area DPA, the first touch pad area TPA1, and the second touch pad area TPA2 may be electrically connected to the display circuit board 300 using an anisotropic conductive film or a low-resistance high-reliability material such as SAP. However, embodiments of the present disclosure are not necessarily limited thereto.

The display pad area DPA may include a plurality of display pad units. The display pad units may be connected to a main processor through the display circuit board 300. The display pad units may be connected to the display circuit board 300 to receive digital video data and may supply the digital video data to the display driving circuit 200.

Figure 5:
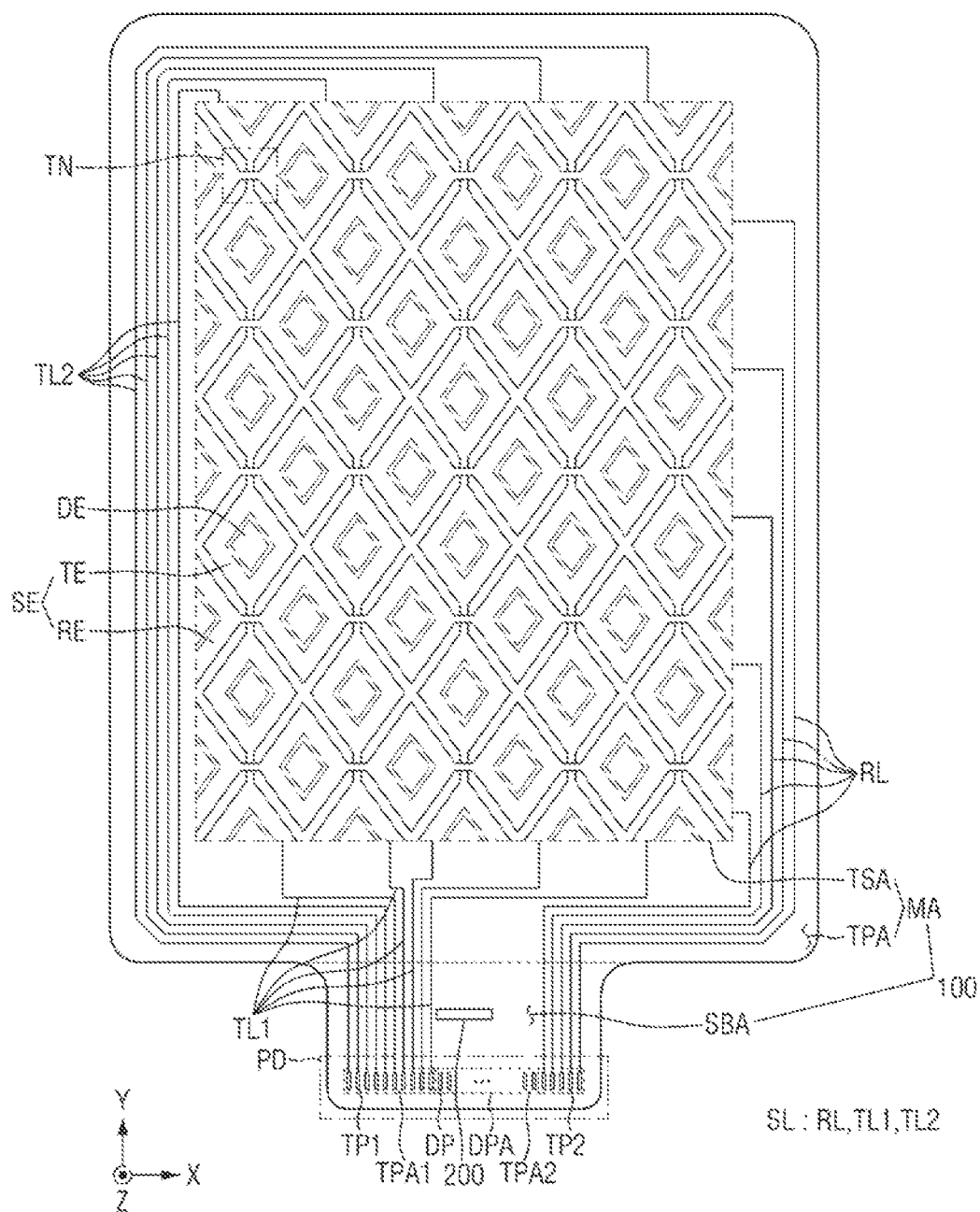
FIG. 5 is a schematic layout view of a touch sensing unit illustrated in FIG. 3 according to an embodiment of the present disclosure.

FIG. 5 is a schematic layout view of an example of the touch sensing unit TSU illustrated in FIG. 3.

In FIG. 5, touch electrodes SE of the main area MA include two types of electrodes, for example, driving electrodes TE and sensing electrodes RE. In addition, the touch sensing unit TSU is driven using a mutual capacitance method in which touch driving signals are transmitted to the driving electrodes TE, and then a charge change in the mutual capacitance of each of a plurality of touch nodes is sensed through the sensing electrodes RE. The above case will be mainly described below. However, embodiments of the present disclosure are not necessarily limited thereto.

In FIG. 5, only the driving electrodes TE, the sensing electrodes RE, dummy patterns DE, touch lines SL, and first and second touch pads TP1 and TP2 are illustrated for ease of description.

Referring to FIG. 5, the main area MA of the touch sensing unit TSU includes a touch sensing area TSA for sensing a user's touch and a touch peripheral area TPA disposed around the touch sensing area TSA. The touch sensing area TSA may overlap the display area DA of FIGS. 1 through 3, and the touch peripheral area TPA may overlap the non-display area NDA.

The driving electrodes TE, the sensing electrodes RE, and the dummy patterns DE are disposed in the touch sensing area TSA. The driving electrodes TE and the sensing electrodes RE may be electrodes for forming mutual capacitance to sense a touch of an object or a user.

The sensing electrodes RE may be arranged side by side in the first direction (e.g., the X-axis direction) and the second direction (e.g., the Y-axis direction). The sensing electrodes RE may be electrically connected to each other in the first direction (e.g., the X-axis direction). The sensing electrodes RE adjacent to each other in the first direction (e.g., the X-axis direction) may be connected to each other. The sensing electrodes RE adjacent to each other in the second direction (e.g., the Y-axis direction) may be electrically isolated from each other. Accordingly, a touch node TN having mutual capacitance may be disposed at each of the intersections of the driving electrodes TE and the sensing electrodes RE. The touch nodes TN may correspond to the intersections of the driving electrodes TE and the sensing electrodes RE.

The driving electrodes TE may be arranged side by side in the first direction (e.g., the X-axis direction) and the second direction (e.g., the Y-axis direction). The driving electrodes TE adjacent to each other in the first direction (e.g., the X-axis direction) may be electrically isolated from each other. The driving electrodes TE may be electrically connected to each other in the second direction (e.g., the Y-axis direction). For example, in an embodiment the driving electrodes TE adjacent to each other in the second direction (e.g., the Y-axis direction) may be connected to each other through a connection electrode.

Each of the dummy patterns DE may be surrounded by a driving electrode TE or a sensing electrode RE. Each of the dummy patterns DE may be electrically isolated from the driving electrode TE or the sensing electrode RE. Each of the dummy patterns DE may be spaced apart from the driving electrode TE or the sensing electrode RE. For example, in an embodiment each of the dummy patterns DE may be electrically floating.

Although each of the driving electrodes TE, the sensing electrodes RE, and the dummy patterns DE has a rhombic planar shape as shown in an embodiment of FIG. 5, embodiments of the present disclosure are not necessarily limited thereto. For example, each of the driving electrodes TE, the sensing electrodes RE, and the dummy patterns DE may also be shaped like a quadrilateral other than a rhombus, a polygon other than a quadrilateral, a circle, or an oval in a plan view (e.g., in a plane extending in the X-axis direction and the Y-axis direction).

The touch lines SL may be disposed in the touch peripheral area TPA. The touch lines SL include first touch driving lines TL1 and second touch driving lines TL2 connected to the driving electrodes TE and touch sensing lines RL connected to the sensing electrodes RE.

In an embodiment, the sensing electrodes RE disposed at an end of the touch sensing area TSA may be connected one-to-one to the touch sensing lines RL. For example, in an embodiment rightmost sensing electrodes RE among the sensing electrodes RE electrically connected to each other in the first direction (e.g., the X-axis direction) may be respectively connected to the touch sensing lines RL as illustrated in FIG. 5. In addition, in an embodiment the touch sensing lines RL may be connected one-to-one to the second touch pads TP2 disposed in a pad unit PD.

In an embodiment, the driving electrodes TE disposed at an end of the touch sensing area TSA may be connected one-to-one to the first touch driving lines TL1, and the driving electrodes TE disposed at the other end of the touch sensing area TSA may be connected one-to-one to the second touch driving lines TL2. For example, the lowermost driving electrodes TE (e.g., in the Y-axis direction) among the driving electrodes TE electrically connected to each other in the second direction (e.g., the Y-axis direction) may be connected to the first touch driving lines TL1, respectively, and uppermost driving electrodes TE (e.g., in the Y-axis direction) may be connected to the second touch driving lines TL2, respectively. The second touch driving lines TL2 may pass a left side of the touch sensing area TSA and then may be connected to the driving electrodes TE on an upper side of the touch sensing area TSA.

In an embodiment, the first touch driving lines TL1 and the second touch driving lines TL2 may be connected one-to-one to the first touch pads TP1 disposed in the pad unit PD. The driving electrodes TE are connected to the first and second touch driving lines TL1 and TL2 on both sides of the touch sensing area TSA to receive touch driving signals. Therefore, it is possible to prevent a difference between touch driving signals transmitted to the driving electrodes TE disposed on a lower side of the touch sensing area TSA and touch driving signals transmitted to the driving electrodes TE disposed on the upper side of the touch sensing area TSA from occurring due to the resistive-capacitive (RC) delay of the touch driving signals.

In an embodiment in which the display circuit board 300 is connected to a side of the display panel 100 as illustrated in FIGS. 1 through 3, the display pad area DPA and the first and second touch pad areas TPA1 and TPA2 of the pad unit PD may correspond to pads of the display circuit board 300 connected to the display panel 100. Therefore, the pads of the display circuit board 300 may be placed on display pads DP, the first touch pads TP1 and the second touch pads TP2 to contact them. In an embodiment, the display pads DP, the first touch pads TP1, and the second touch pads TP2 may be electrically connected to the pads of the display circuit board 300 using an anisotropic conductive film or a low-resistance high-reliability material such as SAP. However, embodiments of the present disclosure are not necessarily limited thereto. Therefore, the display pads DP, the first touch pads TP1, and the second touch pads TP2 may be electrically connected to the touch driving circuit 400 disposed on the display circuit board 300.

The touch driving circuit 400 generates touch driving signals based on touch driving firmware, such as according to a touch driving frequency and driving voltage values set in the firmware.

The touch driving circuit 400 outputs the touch driving signals to the driving electrodes TE from leftmost driving electrodes TE to rightmost driving electrodes TE (e.g., in the X-axis direction) in the touch sensing area TSA at a speed corresponding to the touch driving frequency. For example, in an embodiment the touch driving circuit 400 may sequentially output the touch driving signals to the driving electrodes TE from the leftmost driving electrodes TE to the rightmost driving electrodes TE (e.g., in the X-axis direction). Alternatively, the touch driving circuit 400 may divide the driving electrodes TE into a preset number of groups according to programming of the firmware and output the touch driving signals to the groups of driving electrodes TE, respectively. In an embodiment, the touch driving signals may be output as a plurality of pulse signals generated with a magnitude in a range of about 1.8 to about 2.2 V based on the driving voltage values of the firmware.

The touch driving circuit 400 senses a charge change in the mutual capacitance of each of the touch nodes TN from the touch sensing lines RL of the touch sensing unit TSU and the second touch pads TP2. In an embodiment, the touch driving circuit 400 may include operational amplifiers for sensing charge changes in the mutual capacitances of the touch nodes TN. Accordingly, the touch driving circuit 400 may sequentially convert output voltages generated according to the respective charge changes of the touch nodes TN amplified by the operational amplifiers into touch data which is digital data. In addition, the touch driving circuit 400 extracts difference data values by sequentially comparing touch data for touch sensing signals with preset sensing reference data. Accordingly, the touch driving circuit 400 may calculate touch position coordinates for touch data having difference data value that is greater than an average value among the sequentially detected touch data and may supply the calculated touch position coordinates to the display driving circuit 200.

As described with reference to FIGS. 4 and 5, the display driving circuit 200 drives the pixels SP of the display area DA based on pre-stored display control firmware, such as using a display driving frequency, control signal output timing, and output voltage values of the display control firmware.

In an embodiment, the touch driving circuit 400 drives the touch electrodes SE in units of at least one frame period based on pre-stored touch driving firmware, such as using a display driving frequency and touch driving signals according to the touch driving firmware.

As described above, both sides of the driving electrodes TE arranged side by side in the second direction (e.g., the Y-axis direction) are connected to the first and second touch driving lines TL1 and TL2 to receive touch driving signals. Therefore, it is possible to prevent an RC delay between the touch driving signals transmitted to both sides of the driving electrodes TE. For example, resistance differences between all driving electrodes TE arranged side by side in the second direction (e.g., the Y-axis direction) may be minimized to close to zero. On the other hand, ends of the sensing electrodes RE arranged side by side in the first direction (e.g., the X-axis direction) are connected to the touch sensing lines RL, respectively, but each of the touch sensing lines RL have different lengths from each other. For example, a touch sensing line RL connected to a sensing electrode RE disposed at one end (e.g., an upper end in the Y-axis direction) of the touch sensing area TSA is the longest, and a touch sensing line RL connected to a sensing electrode RE disposed at the other end (e.g., a lower end in the Y-axis direction) of the touch sensing area TSA is the shortest. Therefore, resistances of the sensing electrodes RE arranged side by side in the first direction (X-axis direction) increase toward one end (e.g., the upper end in the Y-axis direction) of the touch sensing area TSA and decrease toward the other end (e.g., the lower end in the Y-axis direction) of the touch sensing area TSA. Consequently, while the resistance differences between the driving electrodes TE arranged side by side in the second direction (e.g., the Y-axis direction) can be minimized to close to zero, different resistance differences exist between the sensing electrodes RE arranged side by side in the first direction (X-axis direction).

In a touch test conducted on the driving electrodes TE, the sensing electrodes RE, and the touch nodes TN respectively formed at the intersections of the driving electrodes TE and the sensing electrodes RE in the touch sensing unit TSU, the display device 10 having the touch sensing unit TSU is placed on a touch test device.

In the touch test, the touch driving circuit 400 of the display device 10 drives the driving electrodes TE and detects touch sensing signals through the sensing electrodes RE. In addition, the touch driving circuit 400 may calculate a charge change in the mutual capacitance of each of the touch nodes TN, convert output voltages generated according to the respective charge changes of the touch nodes TN into touch data which is digital data, and transmit the touch data to the touch test device.

Figure 6:
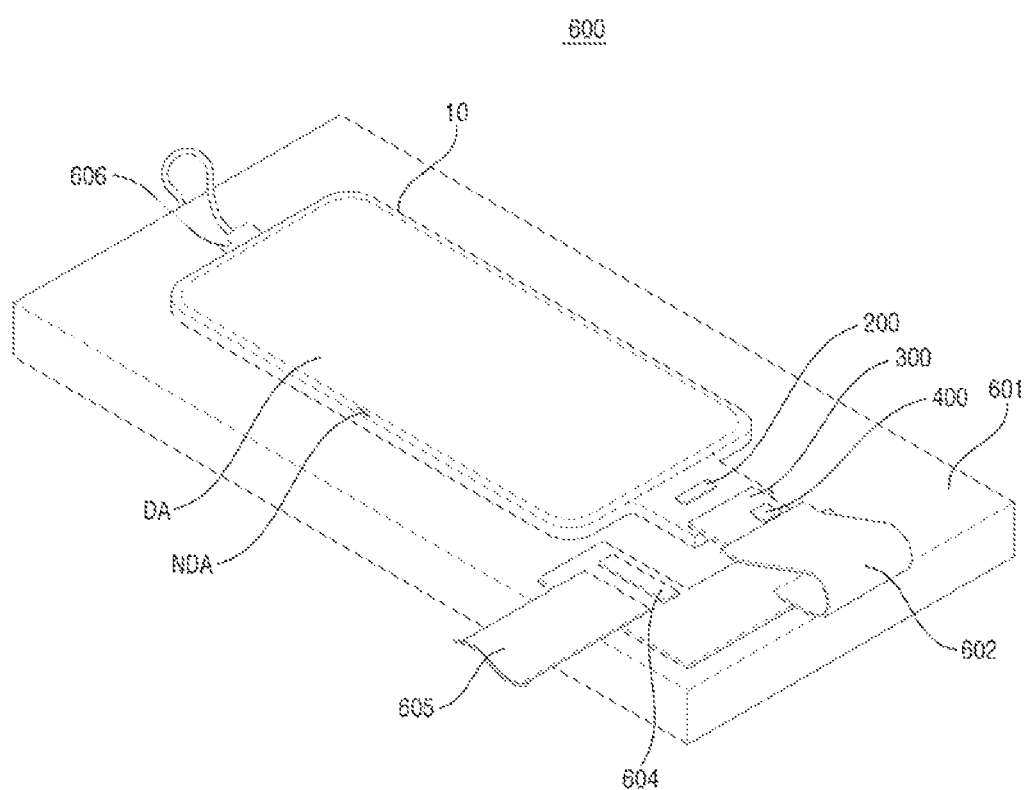
FIG. 6 is a perspective view schematically illustrating a touch test device and a touch test process for a display device according to an embodiment of the present disclosure.
Figure 7:
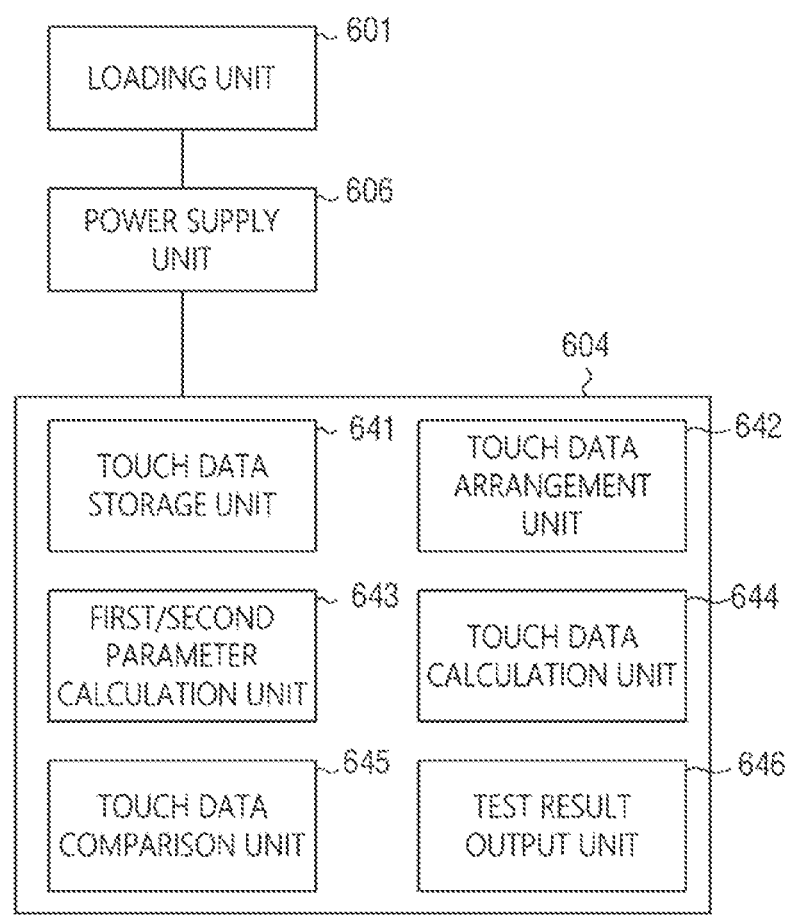
FIG. 7 is a block diagram schematically illustrating components of the touch test device for the display device according to an embodiment of the present disclosure.

FIG. 6 is a perspective view schematically illustrating a touch test device 600 and a touch test process for a display device 10 according to an embodiment. FIG. 7 is a block diagram schematically illustrating components of the touch test device 600 for the display device 10 according to an embodiment.

Referring to FIGS. 6 and 7, in an embodiment the touch test device 600 for the display device 10 includes a loading unit 601 onto which the display device 10 is loaded, a first flexible circuit unit 602, a test processing circuit 604, a second flexible circuit unit 605, and a power supply unit 606.

The display device 10 having a touch sensing unit TSU or a display panel 100 having the touch sensing unit TSU is loaded onto the loading unit 601 of the touch test device 600. For example, the loading unit 601 is configured to receive the display device 10 or the display panel 100.

The power supply unit 606 supplies preset power signals to the display device 10 or the display panel 100 and a touch driving circuit 400. In an embodiment, the power signals may include a direct current (DC) driving voltage source, a driving pulse signal, a gate pulse signal, and an alternating current (AC) driving voltage source.

The touch driving circuit 400 supplies touch driving signals to driving electrodes TE disposed in the touch sensing unit TSU of the display device 10 and detects output voltages and current amounts through the driving electrodes TE and sensing electrodes RE and detects capacitances of touch nodes TN. The touch driving circuit 400 then detects touch signal data for the driving electrodes TE, sensing signal data for the sensing electrodes RE, and touch data of the touch nodes TN by digitally converting the detected output voltage magnitudes and capacitances. In an embodiment, the touch driving circuit 400 may be disposed on a display circuit board 300 formed separately from the display device 10. The touch driving circuit 400 may also be formed in the touch test device 600 separately from the display device 10.

In an embodiment, during a touch test, the touch driving circuit 400 supplies touch driving signals to the driving electrodes TE through second touch driving lines TL2 of the display panel 100. The touch driving circuit 400 then detects the touch driving signals respectively transmitted to the driving electrodes TE through first touch driving lines TL1. For example, voltages and current amounts of the touch driving signals respectively transmitted to the driving electrodes TE are detected through the first touch driving lines TL1. The touch driving circuit 400 converts the touch driving signals into touch signal data, which is digital data, according to changes in the voltage magnitudes and current amounts of the touch driving signals and transmits the touch signal data to the test processing circuit 604 of the touch test device 600.

In addition, the touch driving circuit 400 detects touch sensing signals for the sensing electrodes RE through touch sensing lines RL connected to the sensing electrodes RE, respectively. The touch driving circuit 400 converts the touch sensing signals into sensing signal data, which is digital data, according to changes in voltage magnitudes and current amounts of the touch sensing signals and transmits the sensing signal data to the test processing circuit 604.

In an embodiment, the touch driving circuit 400 calculates a charge change in the mutual capacitance of each of the touch nodes TN by comparing, analyzing, and/or performing an arithmetic operation on the changes in the voltage magnitudes and current amounts of the touch sensing signals together with the changes in the voltage magnitudes and current amounts of the touch driving signals. The touch driving circuit 400 converts output voltages generated according to the respective charge changes of the touch nodes TN into touch data, which is digital data, and transmits the touch data to the test processing circuit 604.

In an embodiment, the first flexible circuit unit 602 transmits the touch signal data of the driving electrodes TE, the sensing signal data of the sensing electrodes RE, and the touch data of the touch nodes TN received from the touch driving circuit 400 to the test processing circuit 604.

In an embodiment, the test processing circuit 604 calculates parameter values that are inversely proportional to resistance deviations of the driving electrodes TE and the sensing electrodes RE. The test processing circuit 604 then performs an arithmetic operation on the calculated parameter values and the touch data of the touch nodes TN and detects defects in the driving electrodes TE or the sensing electrodes RE according to the result of comparing and analyzing the touch data after the arithmetic operation.

For example, in an embodiment the test processing circuit 604 calculates first parameter values that are inversely proportional to resistance deviations of the driving electrodes TE by performing an arithmetic operation on the touch signal data of the driving electrodes TE received from the touch driving circuit 400 using a preset (e.g., predetermined) first inverse proportion formula. In addition, in an embodiment the test processing circuit 604 calculates second parameter values that are inversely proportional to resistance deviations of the sensing electrodes RE by performing an arithmetic operation on the sensing signal data of the sensing electrodes RE using a preset (e.g., predetermined) second inverse proportion formula.

In an embodiment, the test processing circuit 604 corrects the touch data of the touch nodes TN by performing a cross-operation on the touch data of the touch nodes TN and the first and second parameter values using preset first and second ratio calculation formulas. In addition, the test processing circuit 604 compares and analyzes the touch data of the touch nodes TN corrected using the first and second ratio calculation formulas with adjacent corrected touch data and detects defects in the driving electrodes TE or the sensing electrodes RE according to the result of the comparison and analysis.

Referring to FIG. 7, in an embodiment the test processing circuit 604 of the touch test device 600 includes a touch data storage unit 641, a touch data arrangement unit 642, a first/second parameter calculation unit 643, a touch data calculation unit 644, a touch data comparison unit 645, and a test result output unit 646.

In an embodiment, the touch data storage unit 641 of the test processing circuit 604 receives and stores the touch signal data of the driving electrodes TE, the sensing signal data of the sensing electrodes RE, and the touch data of the touch nodes TN from the touch driving circuit 400.

In an embodiment, the touch data arrangement unit 642 arranges the touch signal data and the sensing signal data according to the arrangement order and structure of the driving electrodes TE and the sensing electrodes RE (e.g., in the X-axis and Y-axis directions). In addition, the touch data arrangement unit 642 arranges the touch data of the touch nodes TN according to the intersection structure of the driving electrodes TE and the sensing electrodes RE and the arrangement structure of the touch nodes TN.

In an embodiment, the first/second parameter calculation unit 643 calculates the first parameter values that are inversely proportional to the resistance deviations of the driving electrodes TE by performing an arithmetic operation on the touch signal data of the driving electrodes TE using the preset first inverse proportion formula. In addition, the first/second parameter calculation unit 643 calculates the second parameter values that are inversely proportional to the resistance deviations of the second electrodes RE by performing an arithmetic operation on the sensing signal data of the sensing electrodes RE using the preset second inverse proportion formula.

In an embodiment, the touch data calculation unit 644 corrects the touch data of the touch nodes TN by performing a cross-operation on the touch data, which is arranged by the touch data arrangement unit 642 according to the arrangement structure of the touch nodes TN, and the first and second parameter values using the preset first and second ratio calculation formulas.

In an embodiment, the touch data comparison unit 645 compares and analyzes the touch data of the touch nodes TN corrected using the first and second ratio calculation formulas with adjacent corrected touch data and detects defects in the driving electrodes TE or the sensing electrodes RE according to the result of the comparison and analysis.

In an embodiment, the test result output unit 646 matches the defect detection results of the driving electrodes TE or the sensing electrodes RE received from the touch data comparison unit 645 with positions of the driving electrodes TE or the sensing electrodes RE and outputs the matching results. In an embodiment, data about the defect detection results of the driving electrodes TE or the sensing electrodes RE may be transmitted to an external monitor or management server through the second flexible circuit unit 605. However, embodiments of the present disclosure are not necessarily limited thereto.

Figure 8:
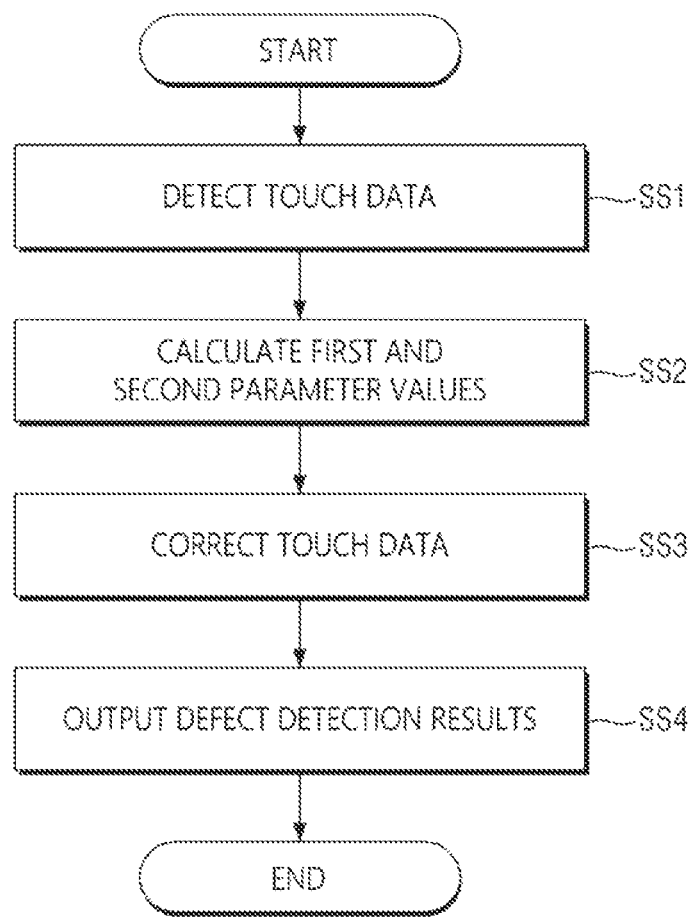
FIG. 8 is a flowchart sequentially illustrating a touch test method for a display device according to an embodiment of the present disclosure.

FIG. 8 is a flowchart sequentially illustrating a touch test method for a display device according to an embodiment.

Referring to FIGS. 7 and 8, during a touch test, the touch driving circuit 400 supplies touch driving signals to the driving electrodes TE disposed in the touch sensing unit TSU. In addition, voltages and current amounts of the touch driving signals respectively transmitted to the driving electrodes TE are detected, and touch sensing signals of the sensing electrodes RE and voltages and current amounts of the touch sensing signals are detected. In an embodiment, the touch driving circuit 400 detects touch signal data and sensing signal data by digitally converting the detected touch driving signals and touch sensing signals and the capacitances of the touch nodes TN. In an embodiment, at this time, the touch driving circuit 400 calculates a charge change in mutual capacitance of each of the touch nodes TN by comparing, analyzing, or performing an operation on changes in the voltage magnitudes and current amounts of the touch sensing signals together with changes in the voltage magnitudes and current amounts of the touch driving signals. The touch driving circuit 400 then converts output voltages generated according to the respective charge changes of the touch nodes TN into digital touch data and transmits the digital touch data to the test processing circuit 604 in operation SS1.

The touch data storage unit 641 receives the touch signal data of the driving electrodes TE, the sensing signal data of the sensing electrodes RE, and the touch data of the touch nodes TN from the touch driving circuit 400 through the first flexible circuit unit 602. In an embodiment, the touch signal data of the driving electrodes TE, the sensing signal data of the sensing electrodes RE, and the touch data of the touch nodes TN may be classified and stored in separate memories or registers in operation SS2.

Figure 9:
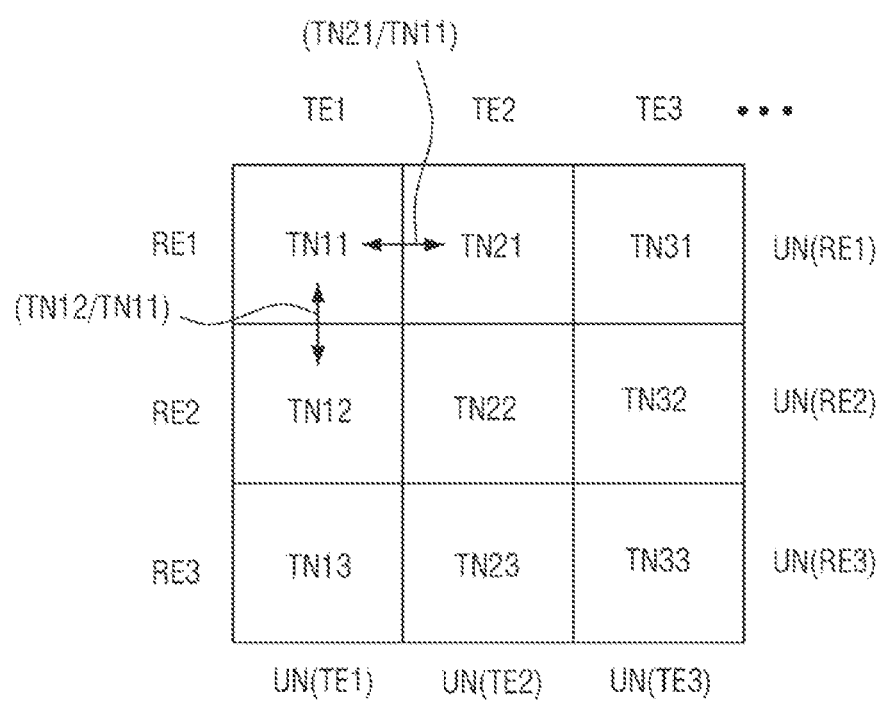
FIG. 9 illustrates a method of comparing touch data of touch nodes adjacent to each other according to an embodiment of the present disclosure.

FIG. 9 illustrates a method of comparing touch data of touch nodes adjacent to each other. FIG. 10 illustrates the arrangement state of touch data of touch nodes and first and second parameter values according to an embodiment.

Referring to FIGS. 9 and 10, the touch data arrangement unit 642 arranges and stores touch signal data and sensing signal data in separate registers or memories according to the arrangement order (e.g., in the X-axis and Y-axis directions) and structure of the driving electrodes TE and the sensing electrodes RE. In addition, touch data of the touch nodes TN are arranged and stored according to the intersection structure of the driving electrodes TE and the sensing electrodes RE.

In an embodiment, the first/second parameter calculation unit 643 calculates first parameter values that are inversely proportional to resistance deviations of the driving electrodes TE by performing an arithmetic operation on the touch signal data of the driving electrodes TE using a preset first inverse proportion formula. In an embodiment, the first inverse proportion formula may be preset as shown in Equation 1 below.

[Equation 1]

$$UN(TEn) = 100 - \frac{\text{Max}(TEn) - \text{Min}(TEn)}{2 \times Avg(TEn)} \times 100, \quad (1)$$

where n is a positive integer, and UN(TEn) is a first parameter value for an $n^{th}$ driving electrode TEn. In addition, Avg(TEn) may be an average value of the touch signal data. According to the first inverse proportion formula, as the resistance deviations of the driving electrodes TE increase, such as a difference between a maximum value of the touch signal data Max(TEn) and a minimum value of the touch signal data Min(TEn), the first parameter values UN(TEn) are calculated as smaller values in inverse proportion to the resistance deviations. Conversely, as the resistance deviations of the driving electrodes TE decrease, such as a difference between a maximum value of the touch signal data Max(TEn) and a minimum value of the touch signal data Min(TEn), the first parameter values UN(TEn) are calculated as larger values in inverse proportion to the resistance deviations.

In addition, the first/second parameter calculation unit 643 calculates second parameter values that are inversely proportional to resistance deviations of the sensing electrodes RE by performing an arithmetic operation on the sensing signal data of the sensing electrodes RE using a preset second inverse proportion formula. The second inverse proportion formula may be preset as shown in Equation 2 below.

[Equation 2]

$$UN(REn) = 100 - \frac{\text{Max}(REn) - \text{Min}(REn)}{2 \times Avg(REn)} \times 100 \quad (2)$$

where UN(REn) is a second parameter value for an $n^{th}$ sensing electrode REn. In addition, Avg(REn) may be an average value of the sensing signal data. According to the second inverse proportion formula, as the resistance deviations of the sensing electrodes RE increase, such as a difference between a maximum value of the sensing signal data Max(REn) and a minimum value of the sensing signal data Min(REn), the second parameter values UN(REn) are calculated as smaller values in inverse proportion to the resistance deviations. Conversely, as the resistance deviations of the sensing electrodes RE decrease, such as a difference between a maximum value of the sensing signal data Max(REn) and a minimum value of the sensing signal data Min(REn), the second parameter values UN(REn) are calculated as larger values in inverse proportion to the resistance deviations.

Referring to FIGS. 9 and 10, in an embodiment the touch data calculation unit 644 may sequentially compare the touch data of the touch nodes TN with adjacent touch data and calculate the uniformity of the touch data according to difference values or difference value ratios. In addition, in an embodiment the touch data calculation unit 644 may compare the touch data of the touch nodes TN with an average value of the touch data and calculate the uniformity of the touch data according to difference values from the average value or difference value ratios.

Referring to FIG. 10, when the uniformity of the touch data is about 30%, each pair of data values of the touch data from touch data (e.g., 1000, 860, 1000, 1000, . . . ) arranged at one end (e.g., an upper end) of the touch sensing area TSA to touch data arranged at the other end of the touch sensing area TSA are different by about 233. For example, in a case in which each pair of the data values of the touch data adjacent in a vertical direction are different by about 233, the uniformity of the touch data may be calculated to be about 30%.

The touch data calculation unit 644 then corrects the touch data of the touch nodes TN by performing a cross-operation on the touch data, which are arranged by the touch data arrangement unit 642 according to the arrangement structure of the touch nodes TN, and the first and second parameter values using preset first and second ratio calculation formulas in operation SS3.

For example, in an embodiment the touch data calculation unit 644 corrects the touch data of the touch nodes TN by performing a cross-operation on touch data, which are adjacent in an arrangement direction (e.g., a direction indicated by a TN21/TN11 arrow) of the driving electrodes TE among the touch data arranged by the touch data arrangement unit 642 according to the arrangement structure of the touch nodes TN, and the second parameter values UN(REn) using the preset first ratio calculation formula. In an embodiment, the first ratio calculation formula may be preset as shown in Equation 3 below.

[Equation 3]

$$GAP(TNmn/TNnm) = UN(REn) \times |TNmn/TNnm| \times 100 - 100, \quad (3)$$

where GAP(TNmn/TNnm) is a corrected data value of touch data obtained by multiplying a difference value (|TNmn/TNnm|) between the touch data adjacent to each other in the arrangement direction of the driving electrodes TE by a second parameter value UN(REn) as a percentage.

As shown in the first ratio calculation formula, the touch data of the touch nodes TN are corrected by cross-applying the second parameter values UN(REn), not the first parameter values UN(TEn) calculated using the touch signal data, to the touch data adjacent in the arrangement direction of the driving electrodes TE using the first ratio calculation formula. For example, the second parameter values UN(REn) are cross-applied because the driving electrodes TE have almost no resistance difference. Therefore, the touch data adjacent in the arrangement direction of the driving electrodes TE are corrected by applying the second parameter values UN(REn) calculated using the sensing signal data of the sensing electrodes RE that have a resistance difference according to position.

In an embodiment, the touch data calculation unit 644 corrects the touch data of the touch nodes TN by performing a cross-operation on touch data, which are adjacent in an arrangement direction (a direction indicated by a TN12/TN11 arrow) of the sensing electrodes RE among the touch data arranged by the touch data arrangement unit 642 according to the arrangement structure of the touch nodes TN, and the first parameter values UN(TEn) using the preset second ratio calculation formula. In an embodiment, the second ratio calculation formula may be preset as shown in Equation 4 below.

[Equation 4]

$$GAP(TNnm/TNmn) = UN(TEn) \times |TNnm/TNmn| \times 100 - 100, \quad (4)$$

where GAP(TNnm/TNmn) is a corrected data value of touch data obtained by multiplying a difference value (|TNnm/TNmn|) between the touch data adjacent in the arrangement direction of the sensing electrodes RE by a first parameter value UN(TEn) as a percentage.

As shown in the second ratio calculation formula, the touch data of the touch nodes TN are corrected by cross-applying the first parameter values UN(TEn), not the second parameter values UN(REn) calculated using the sensing signal data, to the touch data adjacent in the arrangement direction of the sensing electrodes RE using the second ratio calculation formula.

In an embodiment, the first parameter values UN(TEn) are cross-applied because the sensing electrodes RE have a resistance difference according to position. Therefore, the touch data adjacent in the arrangement direction of the sensing electrodes RE are corrected by applying the first parameter values UN(TEn) calculated using the touch signal data of the driving electrodes TE that have no resistance difference.

In an embodiment, the touch data comparison unit 645 compares the touch data of the touch nodes TN corrected using the first and second ratio calculation formulas in each of the arrangement direction of the driving electrodes TE and the arrangement direction of the sensing electrodes RE.

For example, referring to FIG. 9, the touch data comparison unit 645 compares corrected touch data of a touch node TN12 disposed in an intersection area of a second sensing electrode RE2 and a first driving electrode TE1 with corrected touch data of a touch node TN11 and corrected touch data of a touch node TN13 in the arrangement direction of the driving electrodes. In addition, the corrected touch data of the touch node TN12 may be compared with corrected touch data of a touch node TN22 in the arrangement direction of the sensing electrodes.

Figure 11:
FIG. 11 illustrates positions of defective touch driving electrodes detected according to data calculation results of FIG. 10 according to an embodiment of the present disclosure.

FIG. 11 illustrates positions of defective touch driving electrodes detected according to data calculation results of FIG. 10.

Referring to FIG. 11, the touch data comparison unit 645 compares corrected touch data of the touch nodes TN with corrected touch data adjacent in the arrangement directions of the driving electrodes TE and the sensing electrodes RE. In an embodiment, if difference values are greater than or equal to a reference difference value preset according to the uniformity of the touch data, defects of corresponding electrodes may then be detected as defective electrodes OPE.

As illustrated in FIG. 11, in an embodiment if difference values between corrected touch data adjacent in the arrangement direction of the driving electrodes TE and other corrected touch data adjacent to the above corrected touch data are greater than or equal to the preset reference difference value, the touch data comparison unit 645 may detect corresponding electrodes as defective electrodes OPE. Accordingly, the test result output unit 646 matches the results of detecting defects in the driving electrodes TE or the sensing electrodes RE using the touch data comparison unit 645 with the positions of the driving electrodes TE or the sensing electrodes RE and outputs the matching results in operation SS4.

FIG. 12 illustrates the arrangement state of touch data of touch nodes and first and second parameter values according to an embodiment.

Referring to FIG. 12, the touch data calculation unit 644 may sequentially compare the touch data of the touch nodes TN with adjacent touch data and calculate the uniformity of the touch data according to difference values or difference value ratios.

Referring to FIG. 12, in an embodiment in which the uniformity of the touch data is about 50%, each pair of data values of the touch data from touch data (e.g., 1000, 950, 1000, 1000, . . . ) arranged at one end (e.g., the upper end) of the touch sensing area TSA to touch data arranged at the other end of the touch sensing area TSA are different by about 100. For example, when each pair of the data values of the touch data adjacent in the vertical direction are different by about 100, the uniformity of the touch data may be calculated to be about 50%.

In an embodiment, the touch data calculation unit 644 corrects the touch data of the touch nodes TN by performing a cross-operation on touch data, which are adjacent to each other in the arrangement direction of the driving electrodes TE among the touch data arranged by the touch data arrangement unit 642 according to the arrangement structure of the touch nodes TN, and the second parameter values UN(REn) using a preset first ratio calculation formula.

In an embodiment, the touch data calculation unit 644 corrects the touch data of the touch nodes TN by performing a cross-operation on touch data, which are adjacent in the arrangement direction of the sensing electrodes RE among the touch data arranged by the touch data arrangement unit 642 according to the arrangement structure of the touch nodes TN, and the first parameter values UN(TEn) using a preset second ratio calculation formula.

Accordingly, the touch data comparison unit 645 compares the touch data of the touch nodes TN corrected using the first and second ratio calculation formulas in each of the arrangement direction of the adjacent driving electrodes TE and the arrangement direction of the adjacent sensing electrodes RE.

FIG. 13 illustrates positions of defective touch driving electrodes detected according to data calculation results of FIG. 12.

Referring to FIG. 13, if difference values between corrected touch data adjacent in the arrangement direction of the driving electrodes TE and other corrected touch data adjacent to the above corrected touch data greater than or equal to a preset reference difference value, the touch data comparison unit 645 may detect corresponding electrodes as defective electrodes OPE. Accordingly, the test result output unit 646 matches the results of detecting defects in the driving electrodes TE or the sensing electrodes RE using the touch data comparison unit 645 with the positions of the driving electrodes TE or the sensing electrodes RE and outputs the matching results.

FIG. 14 illustrates the arrangement state of touch data of touch nodes and first and second parameter values according to an embodiment.

Referring to FIG. 14, in an embodiment the touch data calculation unit 644 sequentially compares the touch data of the touch nodes TN with adjacent touch data and calculates the uniformity of the touch data according to difference values or difference value ratios.

Referring to FIG. 14, when the uniformity of the touch data is about 80%, each pair of data values of the touch data from touch data (e.g., 1000, 985, 1000, 1000, . . . ) arranged at one end (e.g., the upper end) of the touch sensing area TSA to touch data arranged at the other end of the touch sensing area TSA are different by about 25. For example, in an embodiment in which each pair of the data values of the touch data adjacent in the vertical direction are different by about 25, the uniformity of the touch data may be calculated to be about 80%.

In an embodiment, the touch data calculation unit 644 corrects the touch data of the touch nodes TN by performing a cross-operation on touch data, which are adjacent in the arrangement direction of the driving electrodes TE among the touch data arranged by the touch data arrangement unit 642 according to the arrangement structure of the touch nodes TN, and the second parameter values UN(REn) using a preset first ratio calculation formula.

In an embodiment, the touch data calculation unit 644 corrects the touch data of the touch nodes TN by performing a cross-operation on touch data, which are adjacent in the arrangement direction of the sensing electrodes RE among the touch data arranged by the touch data arrangement unit 642 according to the arrangement structure of the touch nodes TN, and the first parameter values UN(TEn) using a preset second ratio calculation formula.

The touch data comparison unit 645 compares the touch data of the touch nodes TN corrected using the first and second ratio calculation formulas in each of the arrangement direction of the adjacent driving electrodes TE and the arrangement direction of the adjacent sensing electrodes RE.

FIG. 15 illustrates positions of defective touch driving electrodes detected according to data calculation results of FIG. 14.

Referring to an embodiment shown in FIG. 15, if difference values between corrected touch data adjacent in the arrangement direction of the driving electrodes TE and other corrected touch data adjacent to the above corrected touch data are greater than or equal to a preset reference difference value, the touch data comparison unit 645 may detect corresponding electrodes as defective electrodes OPE. Accordingly, in an embodiment the test result output unit 646 matches the results of detecting defects in the driving electrodes TE or the sensing electrodes RE using the touch data comparison unit 645 with the positions of the driving electrodes TE or the sensing electrodes RE and outputs the matching results.

Figure 16:
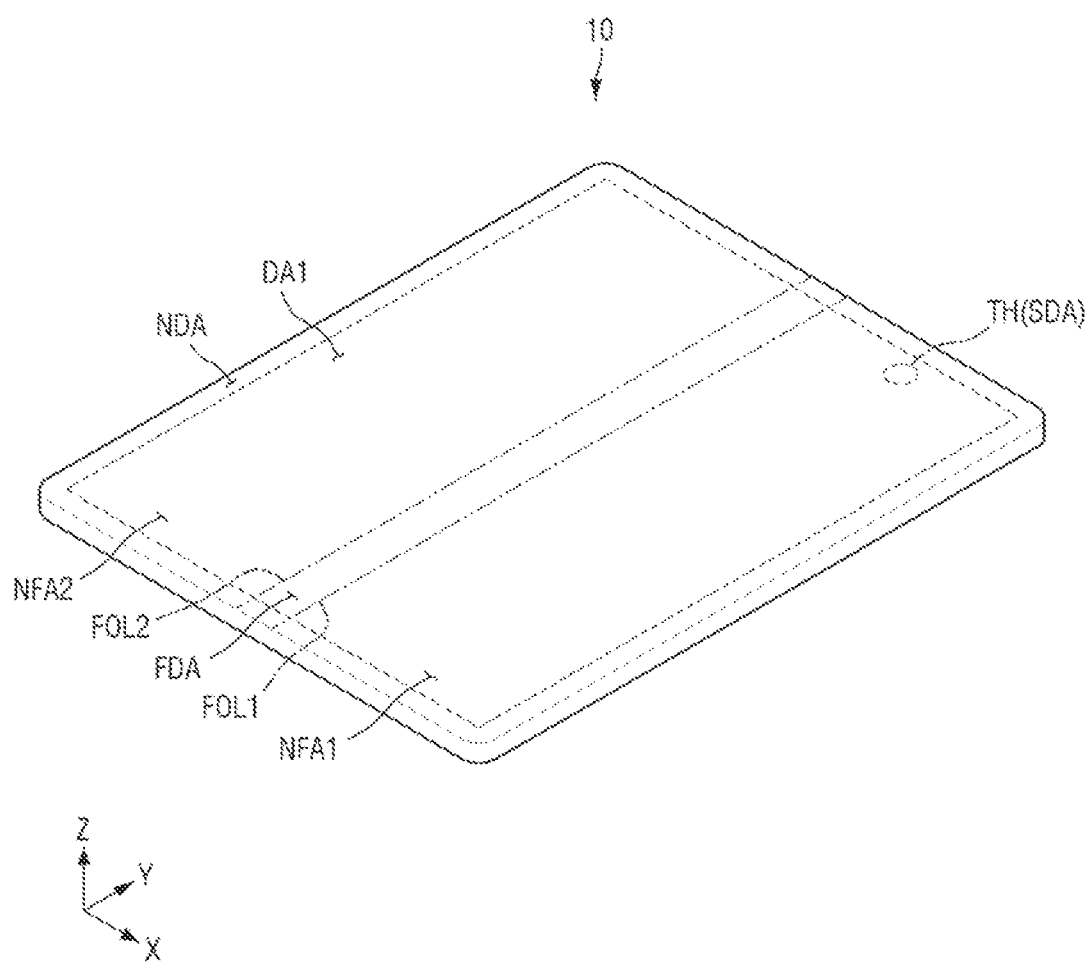
FIGS. 16 and 17 are perspective views of a display device according to embodiments of the present disclosure.
Figure 17:
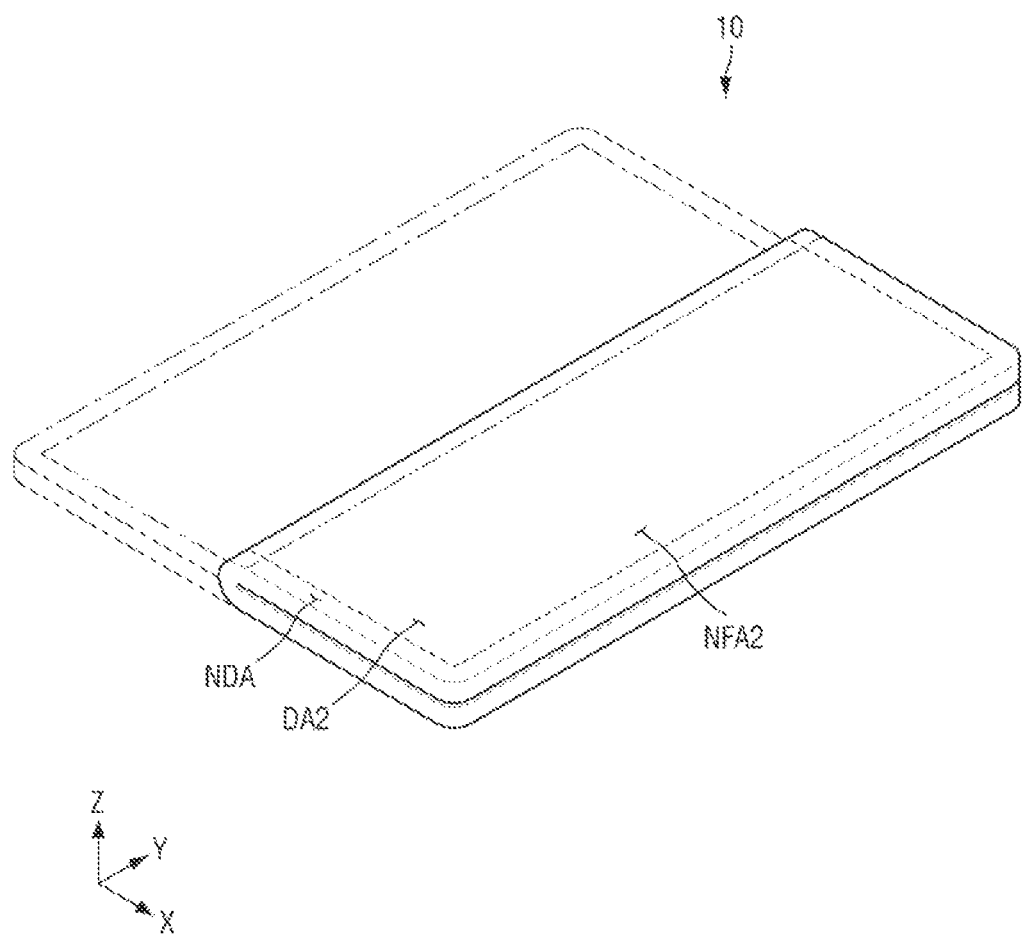

FIGS. 16 and 17 are perspective views of a display device 10 according to embodiments of the present disclosure.

In FIGS. 16 and 17, the display device 10 is illustrated as a foldable display device that is folded in the first direction (e.g., the X-axis direction). However, embodiments of the present disclosure are not necessarily limited thereto and a folding axis of the display device 10 may be variously arranged. The display device 10 may maintain both a folded state and an unfolded state. For example, in an embodiment, the display device 10 may be folded in an in-folding manner in which its front surface is disposed inside. When the display device 10 is bent or folded in the in-folding manner, portions of the front surface of the display device 10 may face each other. In an embodiment, the display device 10 may be folded in an out-folding manner in which its front surface is disposed outside. When the display device 10 is bent or folded in the out-folding manner, portions of a rear surface of the display device 10 may face each other.

A first non-folding area NFA1 may be disposed on a side, e.g., a right side of a folding area FDA (e.g., in the X-axis direction). A second non-folding area NFA2 may be disposed on the other side, e.g., a left side of the folding area FDA (e.g., in the X-axis direction). In an embodiment, a touch sensing unit TSU may be formed and disposed in each of the first non-folding area NFA1 and the second non-folding area NFA2.

In an embodiment as shown in FIG. 16, a first folding line FOL1 and a second folding line FOL2 may extend in the second direction (e.g., the Y-axis direction), and the display device 10 may be folded in the first direction (e.g., the X-axis direction). Therefore, since a length of the display device 10 in the first direction (e.g., the X-axis direction) can be reduced to about half, a user can easily carry the display device 10 and the display device 10 may have increased portability and user convenience.

In some embodiments, the first folding line FOL1 and the second folding line FOL2 may not necessarily extend in the second direction (e.g., the Y-axis direction). For example, in an embodiment the first folding line FOL1 and the second folding line FOL2 may extend in the first direction (e.g., the X-axis direction), and the display device 10 may be folded in the second direction (e.g., the Y-axis direction). In this embodiment, a length of the display device 10 in the second direction (e.g., the Y-axis direction) may be reduced to about half. Alternatively, the first folding line FOL1 and the second folding line FOL2 may extend in a diagonal direction of the display device 10 between the first direction (e.g., the X-axis direction) and the second direction (e.g., the Y-axis direction). In this embodiment, the display device 10 may be folded in a triangular shape.

In an embodiment in which the first folding line FOL1 and the second folding line FOL2 extend in the second direction (e.g., the Y-axis direction), a length of the folding area FDA may be less in the first direction (e.g., the X-axis direction) than in the second direction (e.g., the Y-axis direction). In addition, in an embodiment a length of the first non-folding area NFA1 in the first direction (e.g., the X-axis direction) may be greater than the length of the folding area FDA in the first direction (e.g., the X-axis direction). A length of the second non-folding area NFA2 in the first direction (e.g., the X-axis direction) may be greater than the length of the folding area FDA in the first direction (e.g., the X-axis direction).

In an embodiment as shown in FIG. 16, a first display area DA1 may be disposed on the front surface of the display device 10. The first display area DA1 may overlap the folding area FDA, the first non-folding area NFA1, and the second non-folding area NFA2. Therefore, when the display device 10 is unfolded, an image may be displayed in a forward direction on the folding area FDA, the first non-folding area NFA1, and the second non-folding area NFA2 of the display device 10.

In an embodiment as shown in FIG. 17, a second display area DA2 may be disposed on the rear surface of the display device 10. The second display area DA2 may overlap the second non-folding area NFA2. Therefore, when the display device 10 is folded, an image may be displayed in the forward direction on the second non-folding area NFA2 of the display device 10.

Although a through hole TH in which a camera SDA or the like is formed is disposed in the first non-folding area NFA1 in embodiments shown in FIGS. 16 and 17, embodiments of the present disclosure are not necessarily limited thereto. For example, in an embodiment, the through hole TH or the camera SDA may also be disposed in the second non-folding area NFA2 or the folding area FDA or the through hole TH and camera SDA may be omitted.

Figure 18:
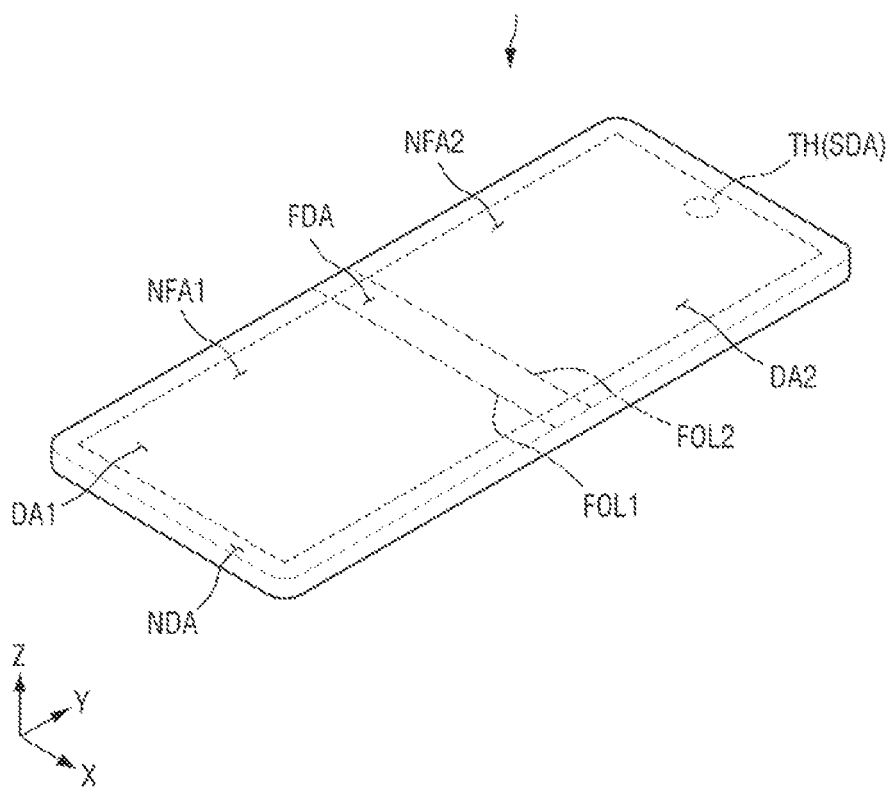
FIGS. 18 and 19 are perspective views of a display device according to embodiments of the present disclosure.
Figure 19:
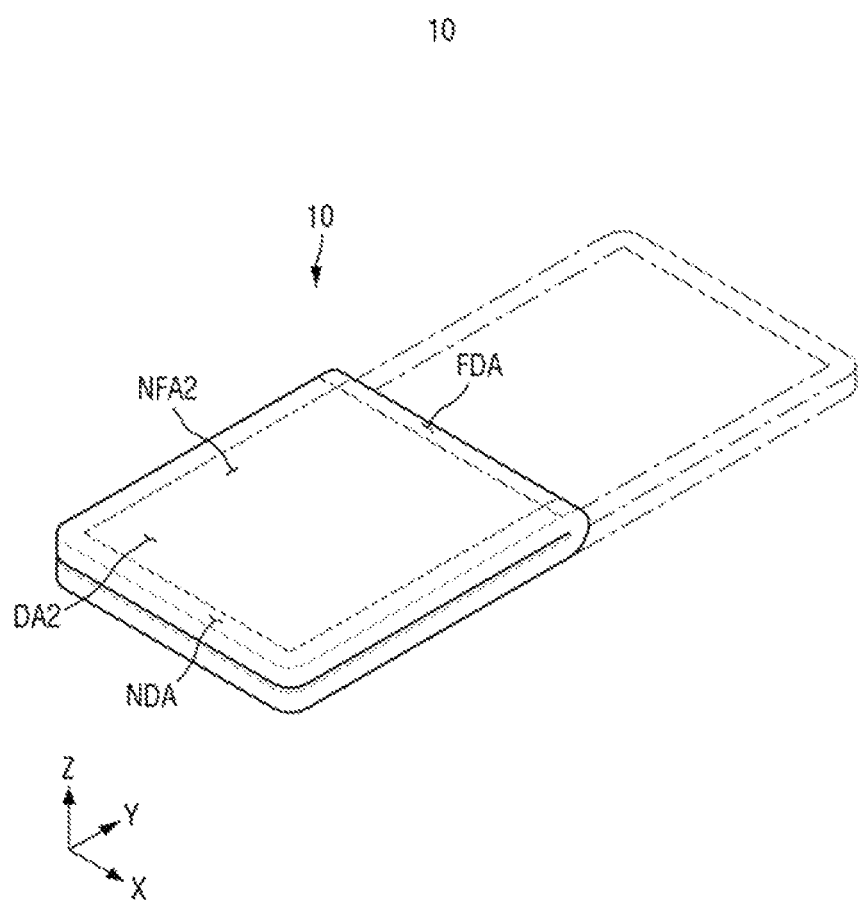

FIGS. 18 and 19 are perspective views of a display device 10 according to an embodiment of the present disclosure.

In FIGS. 18 and 19, the display device 10 is illustrated as a foldable display device that is folded in the second direction (e.g., the Y-axis direction). In an embodiment, the display device 10 may maintain both a folded state and an unfolded state. The display device 10 may be folded in an in-folding manner in which its front surface is disposed inside. When the display device 10 is bent or folded in the in-folding manner, portions of the front surface of the display device 10 may face each other. Alternatively, the display device 10 may be folded in an out-folding manner in which its front surface is disposed outside. When the display device 10 is bent or folded in the out-folding manner, portions of a rear surface of the display device 10 may face each other.

In an embodiment, the display device 10 may include a folding area FDA, a first non-folding area NFA1, and a second non-folding area NFA2. The folding area FDA may be an area where the display device 10 is folded, and the first non-folding area NFA1 and the second non-folding area NFA2 may be areas where the display device 10 is not folded. In an embodiment, the first non-folding area NFA1 may be disposed on a side, e.g., a lower side of the folding area FDA (e.g., in the Y-axis direction). The second non-folding area NFA2 may be disposed on the other side, e.g., an upper side of the folding area FDA (e.g., in the Y-axis direction).

A touch sensing unit TSU according to an embodiment of the present disclosure may be formed and disposed in each of the first non-folding area NFA1 and the second non-folding area NFA2.

In an embodiment, the folding area FDA may be an area that is bent with a predetermined curvature along a first folding line FOL1 and a second folding line FOL2. Therefore, the first folding line FOL1 may be a boundary between the folding area FDA and the first non-folding area NFA1, and the second folding line FOL2 may be a boundary between the folding area FDA and the second non-folding area NFA2.

In an embodiment, the first folding line FOL1 and the second folding line FOL2 may extend in the first direction (e.g., the X-axis direction) as illustrated in embodiments shown in FIGS. 18 and 19, and the display device 10 may be folded in the second direction (e.g., the Y-axis direction). Therefore, since a length of the display device 10 in the second direction (e.g., the Y-axis direction) can be reduced to about half, a user can easily carry the display device 10.

However, in some embodiments the first folding line FOL1 and the second folding line FOL2 may not necessarily extend in the first direction (e.g., the X-axis direction). For example, in an embodiment the first folding line FOL1 and the second folding line FOL2 may extend in the second direction (e.g., the Y-axis direction), and the display device 10 may be folded in the first direction (e.g., the X-axis direction). In this embodiment, a length of the display device 10 in the first direction (X-axis direction) may be reduced to about half. Alternatively, the first folding line FOL1 and the second folding line FOL2 may extend in a diagonal direction of the display device 10 between the first direction (e.g., the X-axis direction) and the second direction (e.g., the Y-axis direction). In this embodiment, the display device 10 may be folded in a triangular shape.

In an embodiment in which the first folding line FOL1 and the second folding line FOL2 extend in the first direction (e.g., the X-axis direction) as illustrated in FIGS. 18 and 19, a length of the folding area FDA may be less in the second direction (e.g., the Y-axis direction) than in the first direction (e.g., the X-axis direction). In addition, a length of the first non-folding area NFA1 in the second direction (e.g., the Y-axis direction) may be greater than the length of the folding area FDA in the second direction (e.g., the Y-axis direction). A length of the second non-folding area NFA2 in the second direction (e.g., the Y-axis direction) may be greater than the length of the folding area FDA in the second direction (e.g., the Y-axis direction).

A first display area DA1 may be disposed on the front surface of the display device 10. The first display area DA1 may overlap the folding area FDA, the first non-folding area NFA1, and the second non-folding area NFA2. Therefore, when the display device 10 is unfolded, an image may be displayed in the forward direction on the folding area FDA, the first non-folding area NFA1, and the second non-folding area NFA2 of the display device 10.

As shown in an embodiment of FIG. 19, a second display area DA2 may be disposed on the rear surface of the display device 10. The second display area DA2 may overlap the second non-folding area NFA2. Therefore, when the display device 10 is folded, an image may be displayed in the forward direction on the second non-folding area NFA2 of the display device 10.

Although a through hole TH in which a camera SDA or the like is placed is disposed in the second non-folding area NFA2 in embodiments shown in FIGS. 18 and 19, embodiments of the present disclosure are not necessarily limited thereto. For example, in some embodiments, the through hole TH may also be disposed in the first non-folding area NFA1 or the folding area FDA or the through hole TH and the camera SDA may be omitted.

In a touch test device and method for a display device according to embodiments of the present disclosure, first parameter values that are inversely proportional to resistance deviations of touch driving electrodes and second parameter values that are inversely proportional to resistance deviations of touch sensing electrodes are calculated. In addition, a cross-operation is selectively performed on touch data sensed through the touch driving electrodes and the touch sensing electrodes and the first and second parameter values, and then the touch data are compared and analyzed. Accordingly, the efficiency of calculating difference values between the touch data and the accuracy of detecting defects in the touch driving electrodes and the touch sensing electrodes can be increased.

However, the effects of embodiments of the present disclosure are not restricted to the one set forth herein. The above and other effects of embodiments of the present disclosure will become more apparent to one of daily skill in the art to which the present disclosure pertains by referencing the claims.

In concluding the detailed description, those skilled in the art will appreciate that many variations and modifications can be made to the described embodiments without substantially departing from the principles of the present disclosure. Therefore, the described embodiments of the present disclosure are used in a generic and descriptive sense only and not for purposes of limitation.

What is claimed is:

1. A touch test device for a display device, the touch test device comprising:
   a loading unit receiving a display device, the display device including a touch sensing unit having driving electrodes and sensing electrodes;
   a touch driving circuit driving the driving electrodes and the sensing electrodes and detecting touch signal data for the driving electrodes, sensing signal data for the sensing electrodes, and touch data of touch nodes positioned at intersections between the driving electrodes and the sensing electrodes; and
   a test processing circuit that calculates parameter values inversely proportional to resistance deviations of the driving electrodes and the sensing electrodes, performs an arithmetic operation on the parameter values and the touch data of the touch nodes to provide corrected touch data, and detects defects in the driving electrodes and the sensing electrodes according to a result of comparing and analyzing the corrected touch data.

2. The touch test device of claim 1, wherein the touch driving circuit detects touch driving signals transmitted to the driving electrodes and touch sensing signals for the sensing electrodes, converts the touch driving signals into the touch signal data and the touch sensing signals into the sensing signal data, and generates the touch data according to a change in mutual capacitance of each of the touch nodes.

3. The touch test device of claim 2, wherein the test processing circuit calculates first parameter values that are inversely proportional to the resistance deviations of the driving electrodes by performing a first arithmetic operation on the touch signal data of the driving electrodes using a first inverse proportion formula and calculates second parameter values that are inversely proportional to the resistance deviations of the sensing electrodes by performing a second arithmetic operation on the sensing signal data of the sensing electrodes using a second inverse proportion formula.

4. The touch test device of claim 3, wherein:
the first inversion proportion formula is as follows:

$$UN(TEn) = 100 - \frac{\text{Max}(TEn) - \text{Min}(TEn)}{2 \times Avg(TEn)} \times 100,$$

where n is a positive integer, UN(TEn) is a first parameter value for an n-th driving electrode TEn, Max(TEn) is a maximum value of the touch signal data, Min(TEn) is a minimum value of the touch signal data and Avg(TEn) is an average value of the touch signal data; and the second inversion proportion formula is as follows:

$$UN(REn) = 100 - \frac{\text{Max}(REn) - \text{Min}(REn)}{2 \times Avg(REn)} \times 100,$$

where UN(REn) is a second parameter value for an n-th sensing electrode REn, Max(REn) is a maximum value of the sensing signal data, Min(REn) is a minimum value of the sensing signal data and Avg(REn) is an average value of the sensing signal data.

5. The touch test device of claim 3, wherein the test processing circuit corrects the touch data of the touch nodes by performing a cross-operation on the touch data of the touch nodes and the first and second parameter values using first and second ratio calculation formulas.

6. The touch test device of claim 5, wherein the first ratio calculation formula is as follows:

$$GAP(TNmn/TNnm) = UN(REn) \times |TNmn/TNnm| \times 100 - 100,$$

where GAP(TNmn/TNnm) is a corrected data value of touch data obtained by multiplying a difference value (|TNmn/TNnm|) between touch data adjacent in an arrangement direction of the driving electrodes by a second parameter value of the second parameter values as a percentage.

7. The touch test device of claim 5, wherein the second ratio calculation formula is as follows:

$$GAP(TNnm/TNmn) = UN(TEn) \times |TNnm/TNmn| \times 100 - 100,$$

where GAP(TNnm/TNmn) is a corrected data value of touch data obtained by multiplying a difference value (|TNnm/TNmn|) between touch data adjacent in an arrangement direction of the sensing electrodes by a first parameter value of the first parameter values as a percentage.

8. The touch test device of claim 5, wherein:
the test processing circuit compares the corrected touch data of the touch nodes with corrected touch data adjacent in arrangement directions of the driving electrodes and the sensing electrodes; and
detects a driving electrode and sensing electrode as defective if difference values between the compared corrected touch data are greater than or equal to a reference difference value preset according to a uniformity of the touch data.

9. The touch test device of claim 2, wherein the test processing circuit comprises:
a touch data arrangement unit sequentially arranging the touch signal data, the sensing signal data, and the touch data of the touch nodes;
a first/second parameter calculation unit calculating first parameter values inversely proportional to the resistance deviations of the driving electrodes by performing a first arithmetic operation on the touch signal data using a first inversion proportion formula and calculating second parameter values inversely proportional to the resistance deviations of the sensing electrodes by performing a second arithmetic operation on the sensing signal data using a second inverse proportion formula;
a touch data calculation unit correcting the touch data of the touch nodes by performing a cross-operation on the touch data and the first and second parameter values using first and second ratio calculation formulas;
a touch data comparison unit detecting defects in the driving electrodes and the sensing electrodes by comparing and analyzing the corrected touch data of the touch nodes with adjacent corrected touch data; and
a test result output unit matching defect detection results of the driving electrodes and the sensing electrodes with positions of the driving electrodes and the sensing electrodes and outputting matching results.

10. The touch test device of claim 9, wherein:
the first inversion proportion formula is as follows:

$$UN(TEn) = 100 - \frac{\text{Max}(TEn) - \text{Min}(TEn)}{2 \times Avg(TEn)} \times 100,$$

where i is a positive integer, UN(TEn) is a first parameter value for an n-th driving electrode TEn, Max(TEn) is a maximum value of the touch signal data, Min(TEn) is a minimum value of the touch signal data and Avg(TEn) is an average value of the touch signal data; and the second inversion proportion formula is as follows:

$$UN(REn) = 100 - \frac{\text{Max}(REn) - \text{Min}(REn)}{2 \times Avg(REn)} \times 100,$$

where UN(REn) is a second parameter value for an n-th sensing electrode REn, Max(REn) is a maximum value of the sensing signal data, Min(REn) is a minimum value of the sensing signal data and Avg(REn) is an average value of the sensing signal data.

11. The touch test device of claim 9, wherein the first ratio calculation formula is as follows:

$$GAP(TNmn/TNnm) = UN(REn) \times |TNmn/TNnm| \times 100 - 100,$$

where GAP(TNmn/TNnm) is a corrected data value of touch data obtained by multiplying a difference value (|TNmn/TNnm|) between touch data adjacent in an arrangement direction of the driving electrodes by a second parameter value of the second parameter values as a percentage.

12. The touch test device of claim 9, wherein the second ratio calculation formula is as follows:

$$GAP(TNnm/TNmn) = UN(TEn) \times |TNnm/TNmn| \times 100 - 100,$$

where GAP(TNnm/TNmn) is a corrected data value of touch data obtained by multiplying a difference value (|TNnm/TNmn|) between touch data adjacent in an arrangement direction of the sensing electrodes by a first parameter value of the first parameter values as a percentage.

13. The touch test device of claim 9, wherein:
the touch data comparison unit compares the corrected touch data of the touch nodes with corrected touch data adjacent in arrangement directions of the driving electrodes and the sensing electrodes; and
detects a driving electrode and a sensing electrode as defective if difference values between the compared corrected touch data are greater than or equal to a reference difference value preset according to a uniformity of the touch data.

14. A touch test method for a display device, the touch test method comprising:
loading the display device onto a loading unit of a test device, the display device including a touch sensing unit having driving electrodes and sensing electrodes;
supplying a power signal to a touch driving circuit of the test device;
driving the driving electrodes and the sensing electrodes by using the touch driving circuit;
detecting touch signal data for the driving electrodes, sensing signal data for the sensing electrodes, and touch data of touch nodes positioned at intersections between the driving electrodes and the sensing electrodes by using the touch driving circuit; and
calculating parameter values that are inversely proportional to resistance deviations of the driving electrodes and the sensing electrodes, performing an arithmetic operation on the parameter values and the touch data of the touch nodes to provide corrected touch data, and detecting defects in the driving electrodes and the sensing electrodes according to a result of comparing and analyzing the corrected touch data using a test processing circuit.

15. The method of claim 14, wherein the detecting of the defects in the driving electrodes and the sensing electrodes comprises:
sequentially arranging the touch signal data, the sensing signal data, and the touch data of the touch nodes;
calculating first parameter values that are inversely proportional to the resistance deviations of the driving electrodes by performing a first arithmetic operation on the touch signal data using a first inverse proportion formula;
calculating second parameter values that are inversely proportional to the resistance deviations of the sensing electrodes by performing a second arithmetic operation on the sensing signal data using a second inverse proportion formula;
correcting the touch data of the touch nodes by performing a cross-operation on the touch data and the first and second parameter values using first and second ratio calculation formulas;
comparing and analyzing the corrected touch data of the touch nodes with adjacent corrected touch data and detecting defect positions of the driving electrodes and the sensing electrodes; and
matching results of detecting the defect positions of the driving electrodes and the sensing electrodes with positions of the driving electrodes and the sensing electrodes and outputting the matching results.

16. The method of claim 15, wherein:
the first inversion proportion formula is as follows:

$$UN(TEn) = 100 - \frac{\text{Max}(TEn) - \text{Min}(TEn)}{2 \times Avg(TEn)} \times 100,$$

where n is a positive integer, UN(TEn) is a first parameter value for an n-th driving electrode TEn, Max(TEn) is a maximum value of the touch signal data, Min(TEn) is a minimum value of the touch signal data and Avg(TEn) is an average value of the touch signal data; and
the second inversion proportion formula is as follows:

$$UN(REn) = 100 - \frac{\text{Max}(REn) - \text{Min}(REn)}{2 \times Avg(REn)} \times 100,$$

where UN(REn) is a second parameter value for an n-th sensing electrode REn, Max(REn) is a maximum value of the sensing signal data, Min(REn) is a minimum value of the sensing signal data and Avg(REn) is an average value of the sensing signal data.

17. The method of claim 15, wherein the first ratio calculation formula is as follows:

$$GAP(TNmn/TNnm) = UN(REn) \times |TNmn/TNnm| \times 100 - 100,$$

where GAP(TNmn/TNnm) is a corrected data value of touch data obtained by multiplying a difference value (|TNmn/TNnm|) between touch data adjacent in an arrangement direction of the driving electrodes by a second parameter value of the second parameter values as a percentage.

18. The method of claim 15, wherein the second ratio calculation formula is as follows:

$$GAP(TNnm/TNmn) = UN(TEn) \times |TNnm/TNmn| \times 100 - 100,$$

where GAP(TNnm/TNmn) is a corrected data value of touch data obtained by multiplying a difference value (|TNnm/TNmn|) between touch data adjacent in an arrangement direction of the sensing electrodes by a first parameter value of the first parameter values as a percentage.

* * * * *